United States Patent [19]

Sukonick et al.

[11] E Re. 31,200

[45] Reissued Apr. 5, 1983

[54] RASTER SCAN DISPLAY APPARATUS FOR DYNAMICALLY VIEWING IMAGE ELEMENTS STORED IN A RANDOM ACCESS MEMORY ARRAY

[75] Inventors: Josef S. Sukonick, Cupertino; Greg J. Tilden, San Jose, both of Calif.

[73] Assignee: Xtrak Corporation, Sunnyvale, Calif.

[21] Appl. No.: 82,592

[22] Filed: Oct. 9, 1979

Related U.S. Patent Documents

Reissue of:

[64] Patent No.: 4,070,710
Issued: Jan. 24, 1978
Appl. No.: 650,372
Filed: Jan. 19, 1976

[51] Int. Cl.[3] ..... G09G 1/16

[52] U.S. Cl. ..... 340/724; 340/709; 340/725; 340/726; 340/731; 340/734; 340/744; 340/703; 340/793; 340/799; 364/900

[58] Field of Search ..... 340/709, 721, 725, 726, 340/731, 734, 793, 798, 799

[56] References Cited

U.S. PATENT DOCUMENTS

| | | | |
|---|---|---|---|
| 3,011,164 | 11/1961 | Gerhardt | 340/724 |
| 3,345,458 | 10/1967 | Cole et al. | 340/799 X |
| 3,437,873 | 4/1969 | Eggert | 340/724 X |
| 3,540,012 | 11/1970 | Ehrman | 340/724 X |
| 3,543,244 | 11/1970 | Cuccio | 364/900 |
| 3,593,310 | 7/1971 | Kievit . | |
| 3,610,902 | 10/1971 | Rahenkamp et al. | 340/799 X |
| 3,648,245 | 3/1972 | Dodds et al. | 340/711 X |
| 3,680,077 | 7/1972 | Hoberecht | 340/726 |
| 3,697,678 | 10/1972 | Belleson | 340/709 X |
| 3,716,842 | 2/1973 | Belady et al. | 364/200 |
| 3,729,714 | 4/1973 | Heard | 340/798 X |
| 3,747,087 | 7/1973 | Harrison et al. | 340/703 |
| 3,792,462 | 2/1974 | Casey et al. . | |
| 3,827,041 | 7/1974 | Cook . | |
| 3,858,198 | 12/1974 | Ross | 340/750 X |
| 3,882,446 | 5/1975 | Brittian et al. | 340/706 X |
| 3,891,792 | 6/1975 | Kimura . | |
| 3,896,428 | 7/1975 | Williams . | |
| 3,903,510 | 9/1975 | Zobel | 340/709 X |
| 3,906,480 | 9/1975 | Schwartz et al. | 340/745 |
| 3,925,776 | 12/1975 | Swallow . | |
| 3,976,982 | 8/1976 | Eiselen | 340/705 X |
| 3,988,728 | 10/1976 | Inoue et al. . | |
| 3,996,421 | 12/1976 | Pruznick et al. . | |
| 4,011,556 | 3/1977 | Tochitani et al. | 340/799 X |
| 4,045,789 | 8/1977 | Bristow . | |

OTHER PUBLICATIONS

"Raster Graphics Image Transformer"; Aeronutronic Ford Corp.; RADC-TR-75-172 Final Technical Report; Jul. 1975.

Kreitzer, Fitzgerald; "A Video Display System for Image Processing by Computer;" IEEE Trans. on Computers, vol. C-22, No. 2, Feb. 1973.

Product Release; Video/DMA Interface Unit; Interpretation Systems Incorporated; Jun. 24, 1975.

VDI Series Video/DMA Interface Unit Device Specification Manual; Interpretation Systems Incorporated; Sep. 1975; 54 pp.

Michael Fischer; "A Generalized Image Processor"; Computer Graphics, A Quarterly Report of Siggraph-ACM; vol. 7, No. 3, Fall 1973; 9 pp.

Michael Fischer; "Raster Graphics for Spatial Applications"; Computer Graphics, A Quarterly Report of Siggraph-ACM; vol. 9, No. 2, Summer 1975; 8 pp.

Dunn, Goyal, McCormick, Tareski; "Parametric Description of a Scan-Display System"; Spring Joint Computer Conference, 1969, pp. 187-206.

Entwisle; "An Image Processing Approach to Computer Graphics"; Computors & Graphics, vol. 2, pp. 111-117, Pergamon Press, 1977.

*Primary Examiner*—David L. Trafton
*Attorney, Agent, or Firm*—Spensley, Horn, Jubas & Lubitz

[57] ABSTRACT

A computer graphics display system including random access raster memory for storing data to be displayed, a raster memory control unit for writing data into the raster memory, a video control unit for causing such information to be displayed on a CRT display screen, a micro control unit for controlling the function and timing of the raster memory control unit and the video control unit, and a computer adapter for facilitating data exchange between the micro control unit and a host computer. The displayed image can have extremely high complexity with essentially no problem of display flicker. Zoom and pan features allow the use of a very complex stored image in a flexible manner, and a split-screen technique enables an operator to work on a very complex picture at a detail level while still having an overview of the total picture, or any portion thereof, simultaneously presented before him. The split-screen feature also allows the simultaneous display of alphanumeric messages such as prompts, menus, or X-Y readouts added to the graphics display and a small area of the raster memory is usually reserved for this purpose. An XOR feature allows a selective erase that restores lines crossing or concurrent with erased lines. The XOR feature permits part of the drawing to be moved or "dragged" into place without erasing other parts of the drawing.

45 Claims, 21 Drawing Figures

RMEM BOARD MAP vs. ROW No.

RMEM MAP vs. BOARD No.

RASTER SCAN

RASTER SCAN

RASTER SCAN DISPLAY APPARATUS FOR DYNAMICALLY VIEWING IMAGE ELEMENTS STORED IN A RANDOM ACCESS MEMORY ARRAY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to computer-graphics apparatus and more particularly to a computer-graphics display system for displaying graphic information and enabling various operations to be performed upon the displayed information with minimal participation from the host computer once the raw data has been transferred from the host computer into the display system.

2. Description of the Prior Art

Among the various systems heretofore used to display computer-graphics information are the following:

Random stroke refresh display systems-In these types of devices an instruction list describing the graphics picture as lines and arcs, etc., is kept in a display memory and the entire list is read and transformed from list coordinates to screen coordinates by ultra high speed logic. Each line or arc is then "painted" on a display screen by deflecting an electron beam directly along the line coordinates and the entire list is typically periodically repainted at a rate of between 40 and 60 times a second. Selective erase or change of displayed information is accomplished by editing the picture list. These displays are often capable of zoom and pan operations accomplished by means of transformation hardware. The major limitations of this technique have been expense and allowable picture complexity, the latter referring to a practical limit as to how long a picture list can be before consequent flicker of the display makes it unusable by a human operator.

Direct view storage tube systems—In apparatus of this type an electron beam paints a picture directly on a bystable phosphor-coated screen, which then stores the image until a high voltage erase pulse floods the screen to return all the phosphors to the unwritten state. The picture can be of very high complexity, good quality curved lines can be generated and display flicker is not a problem. This technique has been preferred over the past few years for low cost graphics system. A disadvantage of such apparatus is that no pan or zoom of stored image can be accomplished and no selective erase of stored phosphors is permitted. Moreover, the phosphorous storage tubes have two further limitations in that they characteristically have low luminescense requiring subdued room lighting for best utilization, and the tubes normally age, especially around the center and edges of the display screen, and typically require replacement once or twice a year. Tube replacement is a high cost item which over a three-year period can cost as much as 80% to 200% of the initial purchase price of the display apparatus.

Plasma panel systems—A plasma panel is comprised of small neon gas discharge tubes arranged most popularly in a 512×512 matrix and provides a much brighter picture than the previously mentioned display tube. However, systems incorporating such panels cannot zoom or pan the stored image. With the exception that limited selective erase is permitted, the plasma panel display is similar to the storage tube display in that each neon tube "remembers" its on/off state and no complexity limit or flicker is apparent. Although the 512×512 raster causes some graininess in curved lines, the most serious drawback of this type of display for graphics uses is that no method of implementing a cursor (targeting symbol) on the panel is offered, whereas all other prior art devices provide such a feature.

Scan conversion memory systems—This technique uses an indirect view storage tube wherein a picture is drawn on a semiconducting surface with an electric charge. A reading beam is then swept over the charged surface in a raster pattern and the beam readout is output to a TV monitor. A major use of the scan conversion technique has been to convert European standard TV signals (over 600 lines) to American standard TV signals (525 lines). The display device operates much like a direct view storage tube and is capable of displaying a picture of high complexity. Good quality curved lines can be generated and various shades of grey can be displayed. At least two graphics devices of this type have been introduced since 1973 with both devices using interlaced video at 60 fields/30 frames per second. Zoom and pan are possible but of limited value since the effective resolution of the scan converter seems to be of about a 300 dot square, much too coarse to justify much zooming. By way of comparison, the direct view storage tube devices seem to have about two to four times the resolution of these types of devices. Limited selective erase is permitted on scan conversion displays and a video cursor may be mixed in with the video but with a 3%–5% estimated positional error since the cursor is not written on the storage surface and many variables such as beam focusing, intensity deflection, and pin cushion errors sum together to effect cursor misalignment. Under zoom, any cursor position error is even further exaggerated. Horizontal line flicker, an effect known as the "Kell factor" is also inherent in these types of displays.

Serial raster displays—These devices use a serial digital memory implemented from shift registers (using integrated circuit, CCD, magnetic bubbles or other techniques) or rotating serial memories, i.e., magnetic disks, or drums, or other rotating devices. The video control units utilized in such systems are relatively simple and no devices currently on the market include pan, zoom, or split-screen features. Although the displayed picture can be of very high complexity, the cost of such devices is slightly higher than the storage tube devices. The typical dot matrix for such systems is a single 256×256 raster with an alternate 512×512 raster as an extra cost option. In present systems, limited selective erase is offered with no XOR capability. Color display options are also offered but increase the price of the system by a factor of two or three. Good graphic cursors may be provided with essentially no location error between cursor and picture. The limitations of such devices are slow dot writing speeds, because of limited access to individual bits in the serial memory, and limited resolution causing very distinct graininess in curved lines. No such system offers split screen, zoom, pan, or XOR.

Random access raster displays—These types of systems are generally similar to the serial raster displays mentiond above but employ random access digital memories, (magnetic cores, integrated circuits, etc.) for the raster memory. Several devices of this type have recently been introduced, mainly due to the reduction in the cost of random access memories. Typical formats mentioned are 256×256 bits with 512×512 and color offered as optional extra cost features. The principal advantage of these devices over the serial type devices is faster dot write and erase time. Other performance characteristics are substantially identical to the serial raster displays and no system on the market offers split screen, zoom, pan or XOR.

U.S. Pat. Nos. relating to the above types of display systems include Strout, 3,396,377; Okuda et al, 3,836,902; and Schwartz et al, 3,906,480.

SUMMARY OF THE PRESENT INVENTION

Briefly, the preferred embodiment includes a 2048×2048 random access raster memory for storing data to be displayed, a raster memory control unit for writing data into the raster memory and causing such information to be displayed on a CRT display screen, a micro control unit for controlling the function and timing of the raster memory control unit and the video control unit, and a computer channel adapter for facilitating data exchange between the micro control unit and a host computer. A 416×312 raster is displayable on the CRT from the memory.

The displayed image can have extremely high complexity (much higher than any previously available device) with essentially no problem of display flicker. The brightness of the display far exceeds that of direct view storage tube apparatus and tube life is at least five times greater. Zoom and pan features allow the use of a very complex stored image in a flexible manner, and a split-screen technique enables an operator to work on a very complex picture at a detail level while still having an overview of the total picture (or any portion thereof) simultaneously presented before him. The split-screen feature also allows the simultaneous display of alphanumeric messages such as prompts, menus, or X-Y readouts to be added to the graphics display and a small area of the raster memory is usually reserved for this purpose. An XOR feature allows a selective erase superior to those of any prior art raster device especially if the XORed feature is to be moved or "dragged" into place in an existing drawing.

These and other objects, features and advantages of the present invention will no doubt become apparent to those of ordinary skill in the art after having read the following detailed disclosure of the preferred embodiment, which is illustrated in the several figures of the drawing.

IN THE DRAWING

Figure 1:
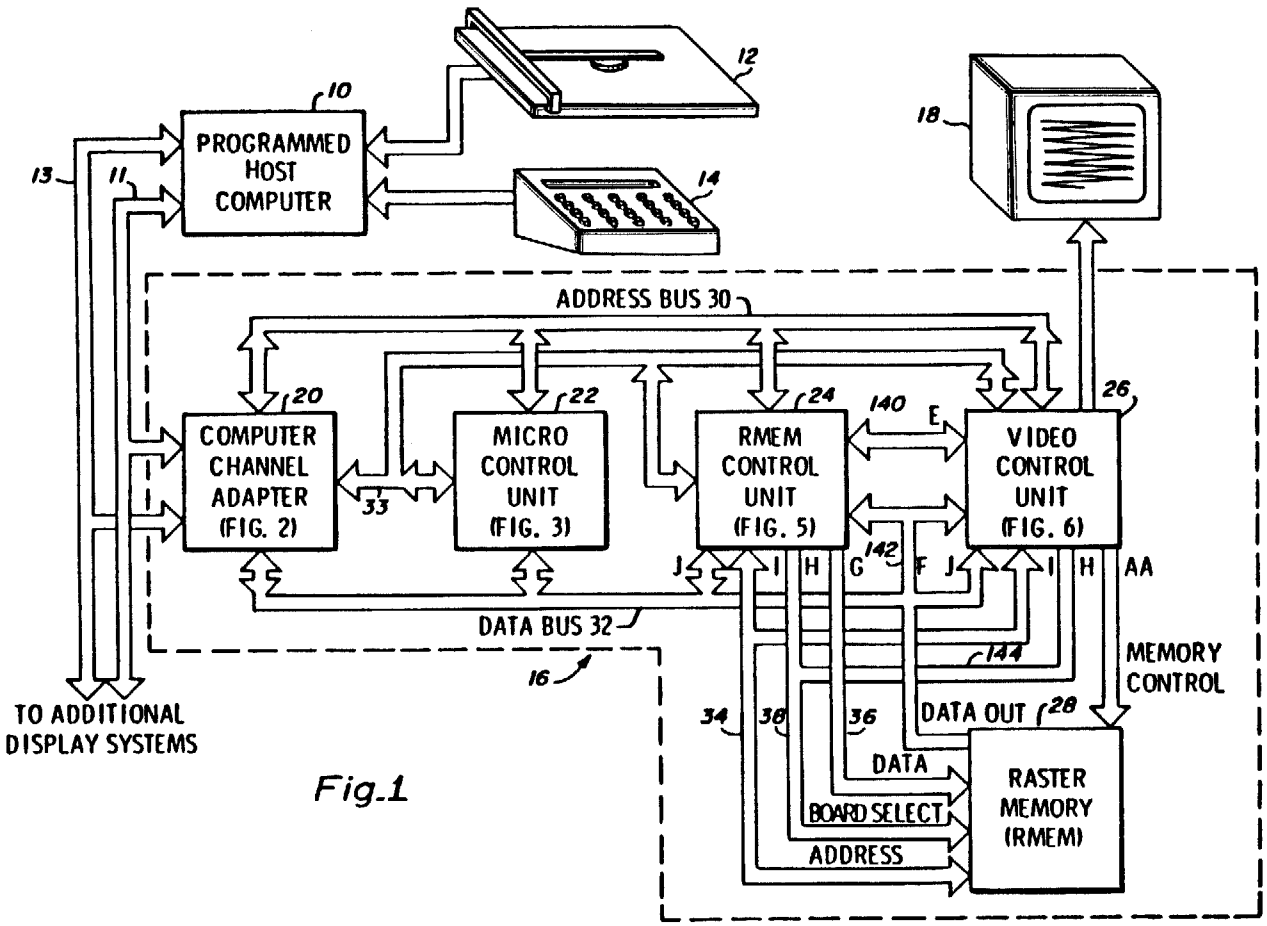
FIG. 1 is a block diagram illustrating the principal components of a computer graphics display system in accordance with the present invention.
Figure 2A:
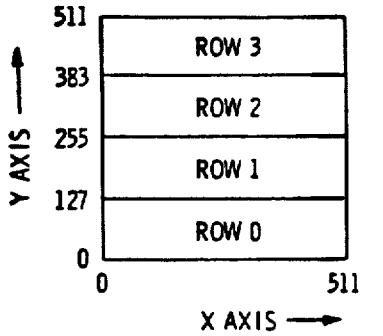
FIGS. 2a and 2b are diagrams illustrating organization of the raster memory shown in FIG. 1.
Figure 2B:
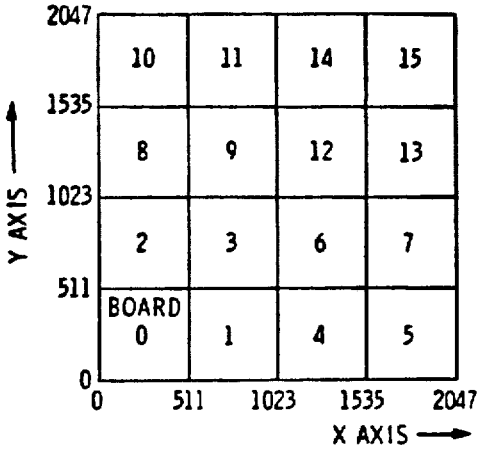
Figure 2C:
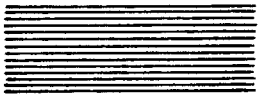
Fig 2c PRIOR ART
Figure 2C:
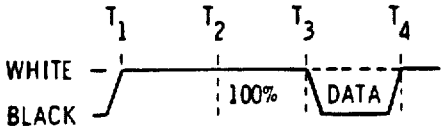
Fig 2c PRIOR ART
Figure 2D:
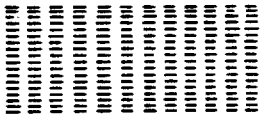
Figure 2D:
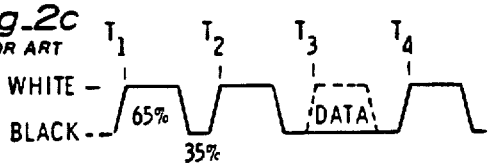
Figure 2E:
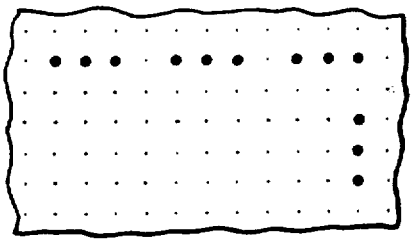
Figure 2F:
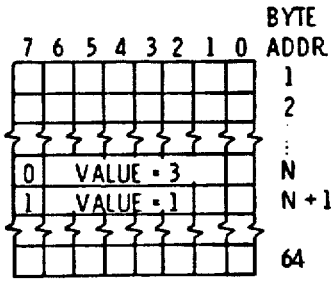
Figure 4:
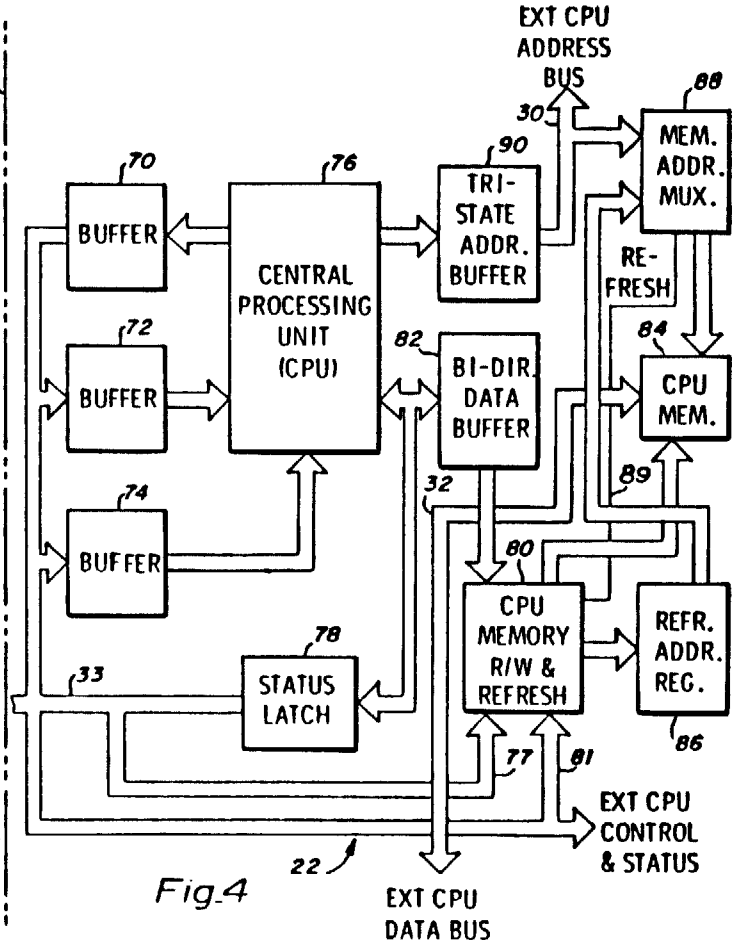
Figure 3:
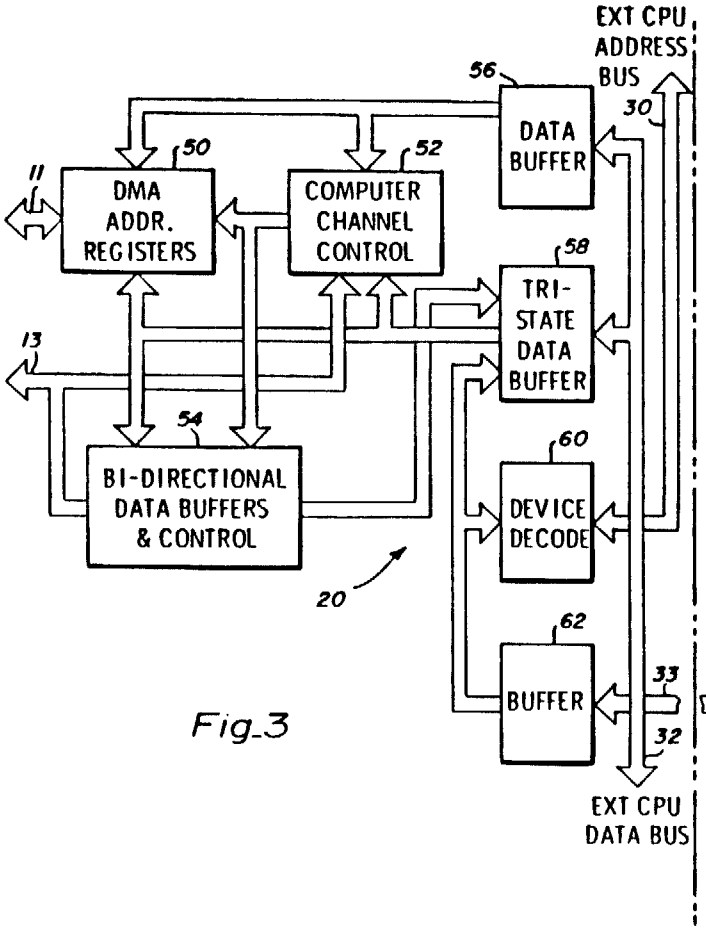
Figure 5A:
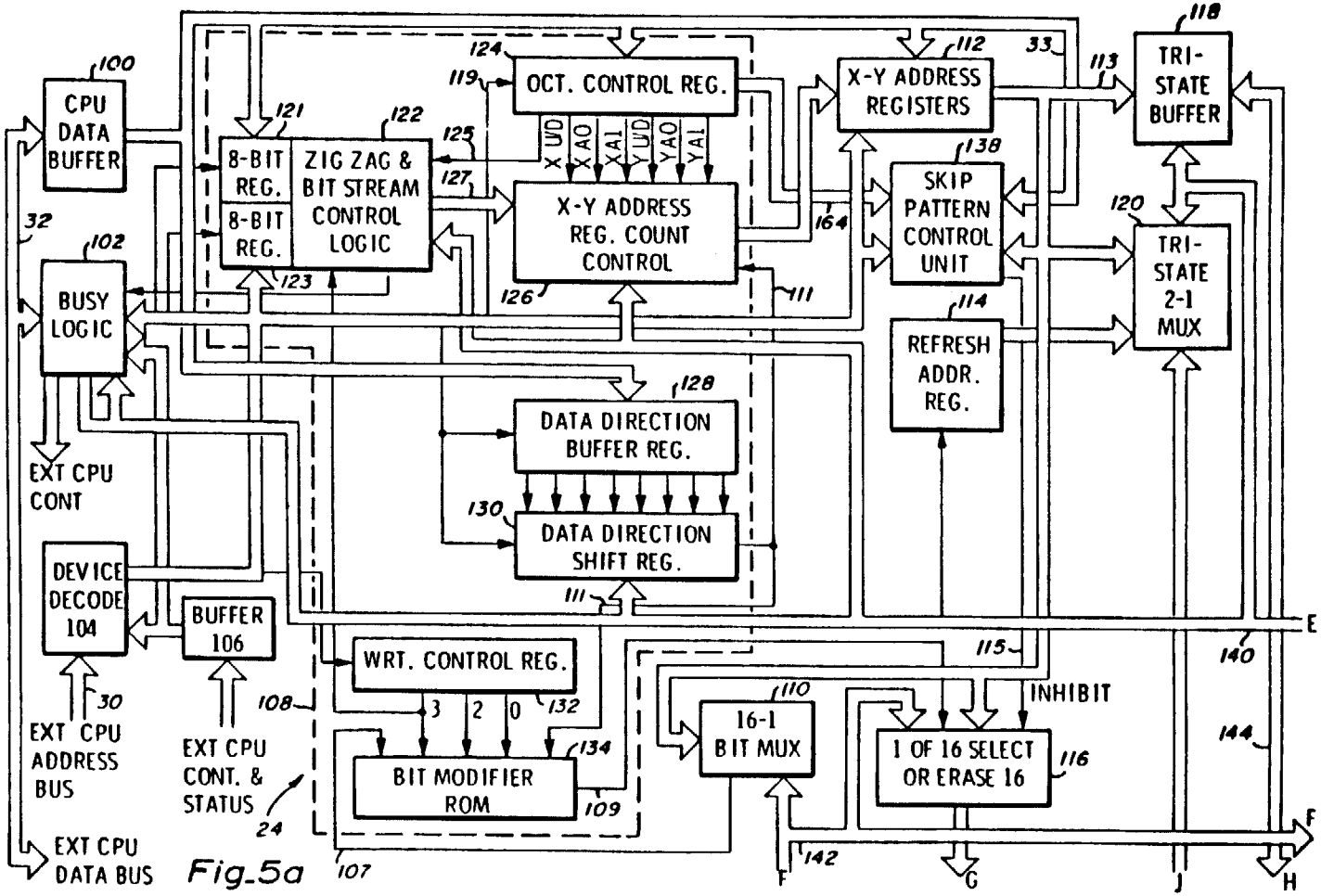
Figure 5B:
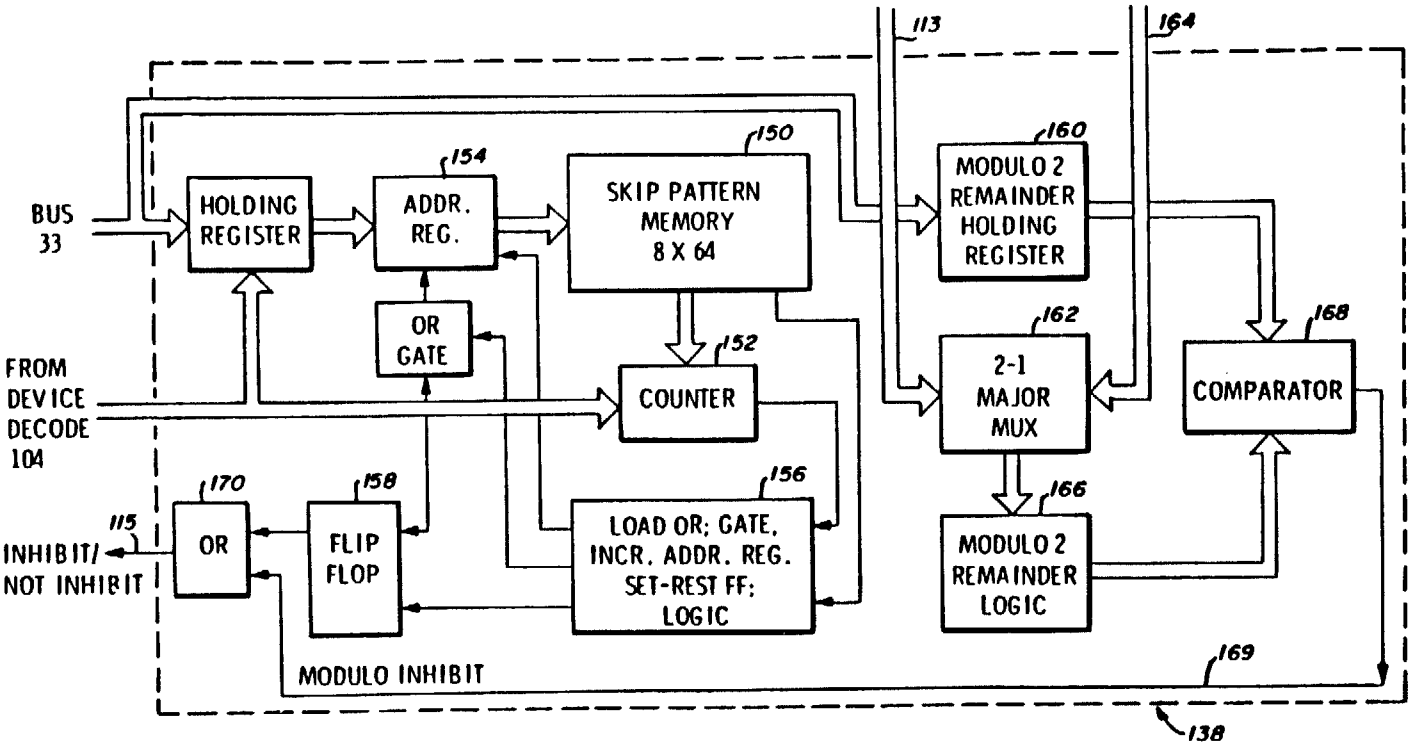
Figure 6:
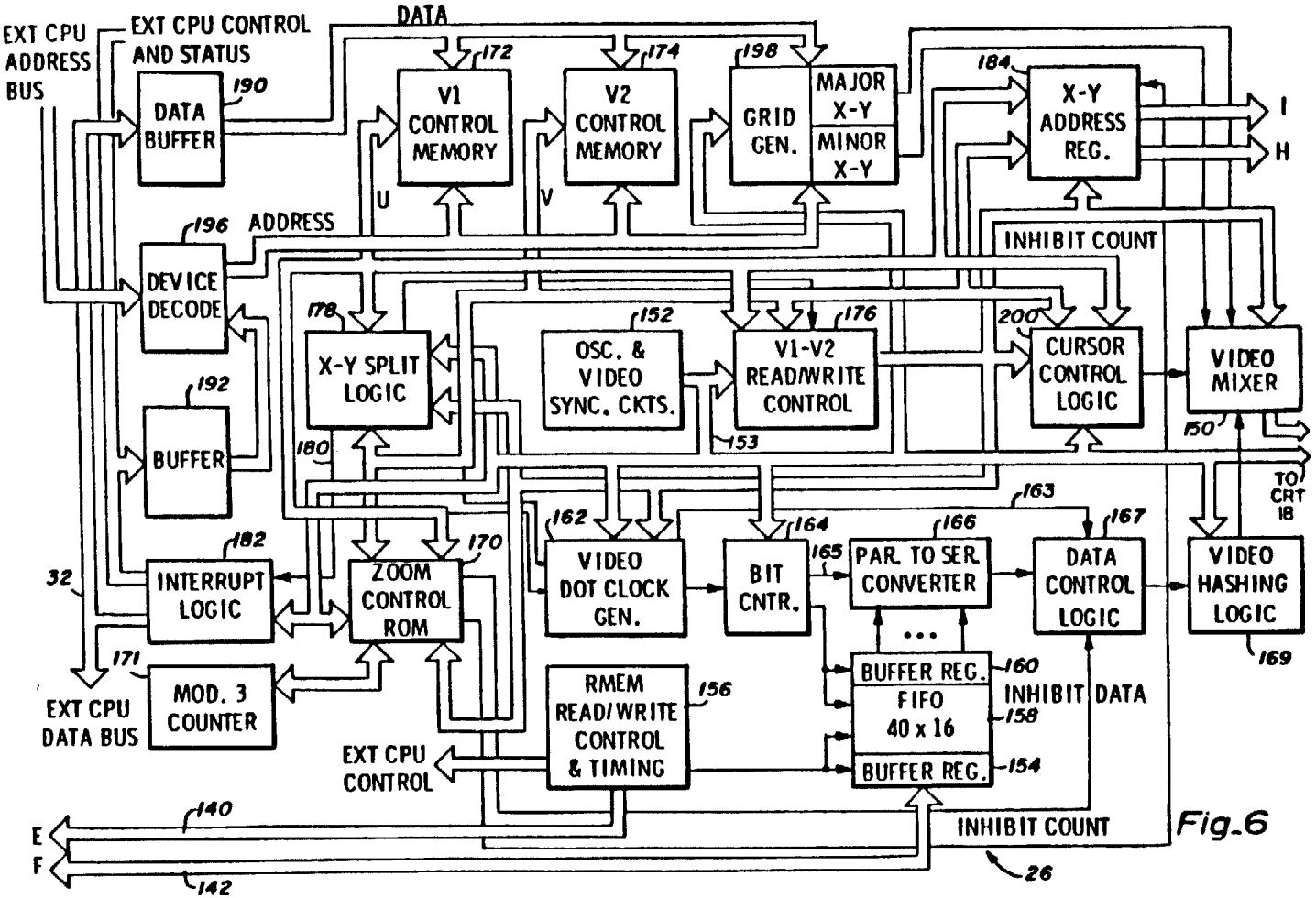
Figure 9:
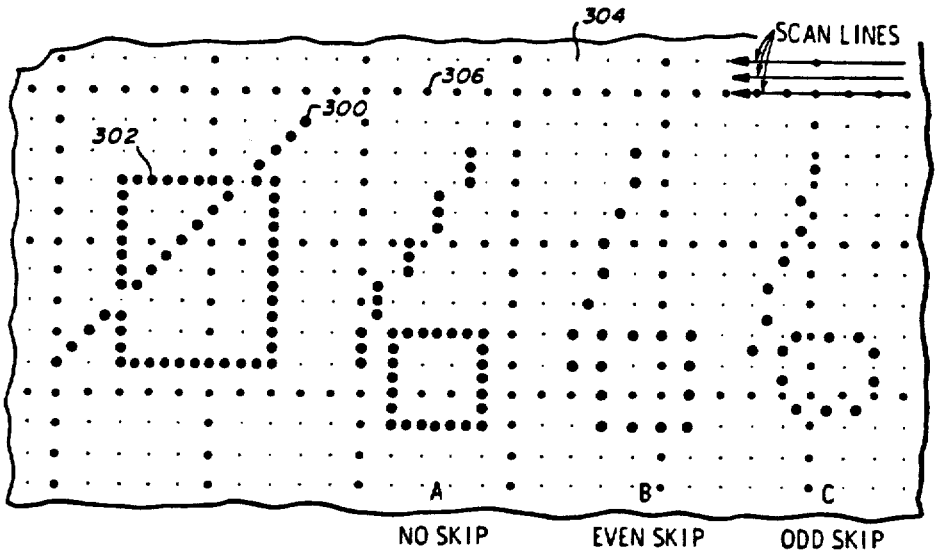
Figure 10A:
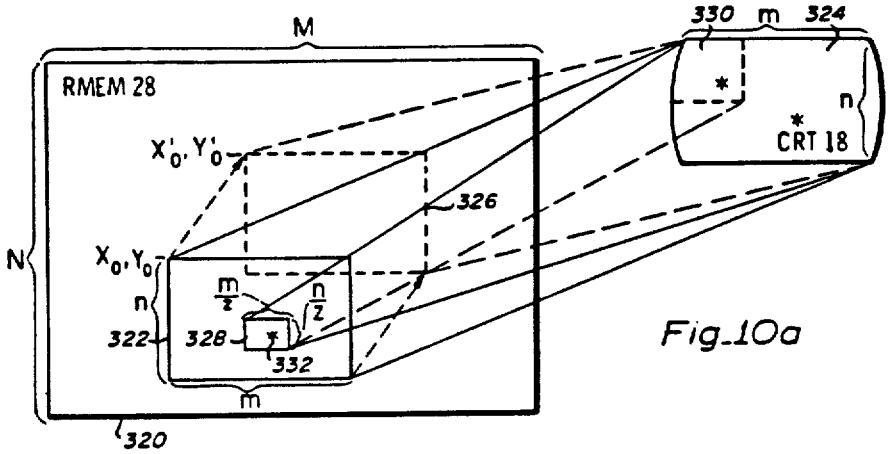
Figure 10B:
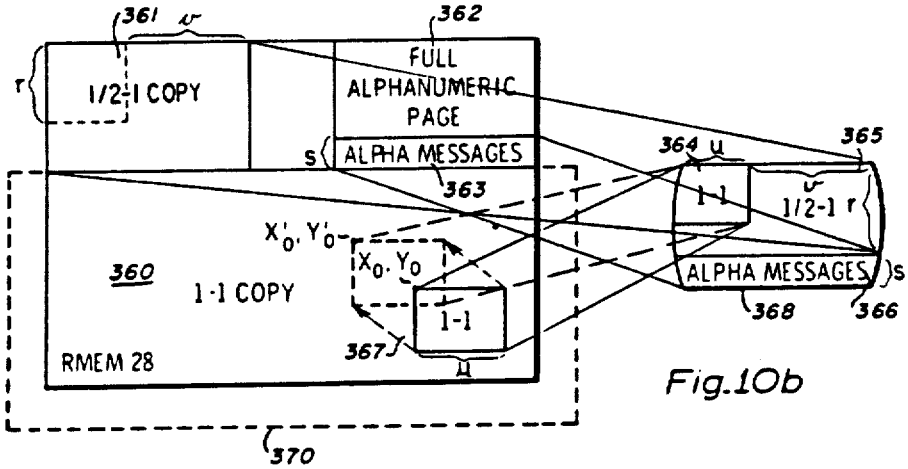
Figure 11:
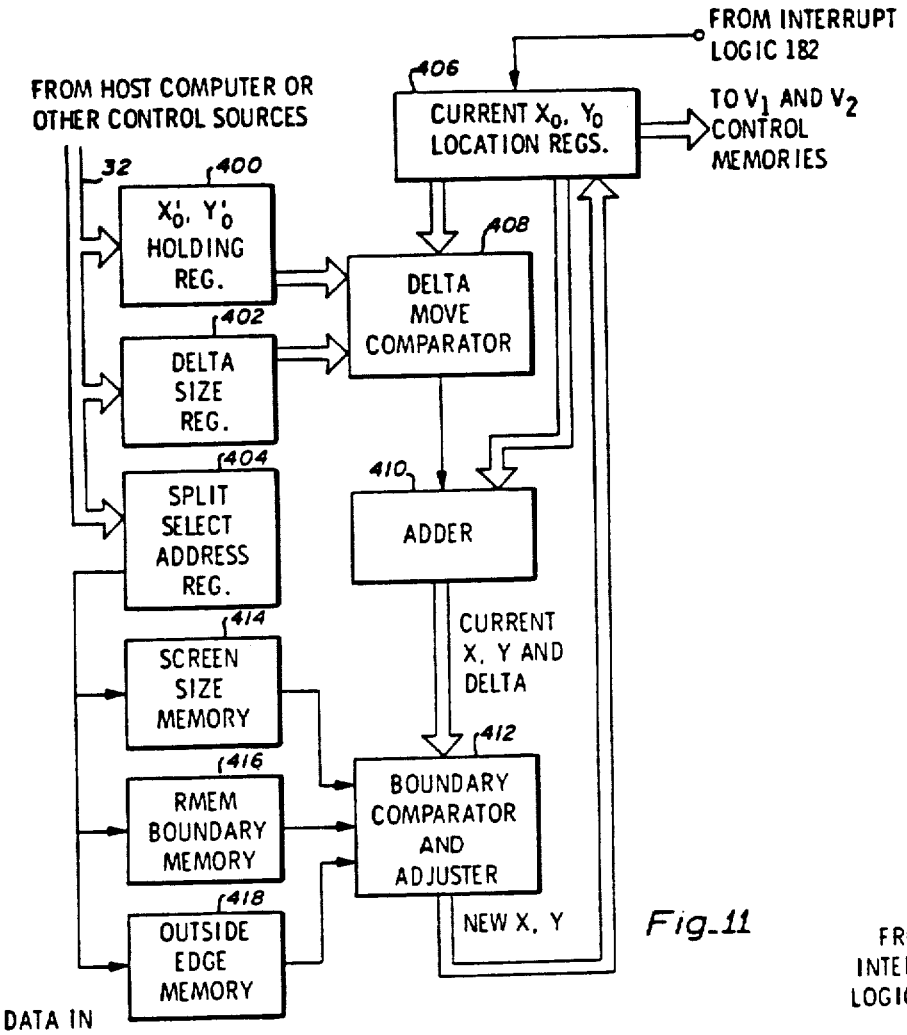
Figure 12:
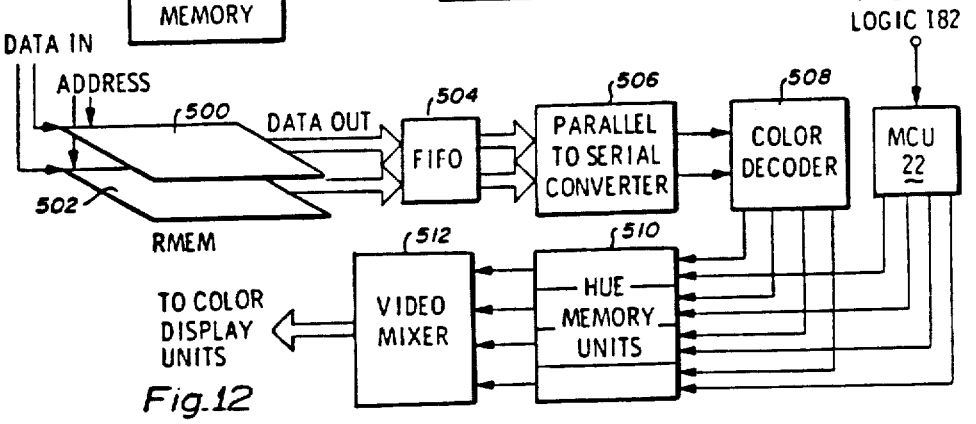

FIGS. 2c and 2d, respectively illustrate prior art raster scan lines and background hashed scan lines in accordance with the present invention;

FIGS. 2e and 2f demonstrate the skip pattern memory feature of the present invention;

FIG. 3 is a block diagram illustrating the principal components of the computer channel adapted shown in FIG. 1;

FIG. 4 is a block diagram illustrating the principal components of the micro control unit shown in FIG. 1;

FIG. 5a is a block diagram illustrating the principal components of the raster memory control unit shown in FIG. 1;

FIG. 5b is a block diagram illustrating the principal components of the skip pattern control unit shown in FIG. 5a;

FIG. 6 is a block diagram illustrating the principal components of the video control unit shown in FIG. 1;

FIGS. 7a and 7b, and 8a and 8b, respectively, illustrate graphics changes without and with XORing in accordance with the present invention;

FIG. 9 illustrates XORing and even/odd skip features of the present invention;

FIGS. 10a and 10b illustrate possible relationships between raster memory data location and display permitted in accordance with the present invention;

FIG. 11 is a block diagram illustrating the principal components of a hardwired pan control circuit in accordance with the present invention; and FIG. 12 is a block diagram generally illustrating alternative components for use in the video control unit to provide color video signals.

DETAILED DESCRIPTION OF THE PREFERRED EMBODIMENTS

Referring now to FIG. 1 of the drawing, there is shown a computer-graphics system including a programmed host computer 10 with its associated graphics input apparatus 12 and keyboard input 14, and a display system 16 in accordance with a preferred embodiment of the present invention. The host computer 10 and its associated input equipment may be any of a variety of well known devices capable of responding to input controls and developing corresponding signals for driving one or more visual display systems 16. In the illustrated preferred embodiment the visual display means is a conventional cathode ray tube (CRT) device 18 but could alternatively take the form of any standard television monitor or display device capable of responding to the raster output developed by the system 16.

In addition to the CRT 18, the control system shown generally at 16 includes a computer channel adapter 20, a micro control unit (MCU) 22, a raster memory (RMEM) control unit 24, a video control unit (VCU) 26 and a raster memory (RMEM) 28. The function of the channel adapter 20 is generally to serve as an interface between the host computer 10 and the MCU 22 and its respective address and data buses 30 and 32. The information received from the host computer 10 is of a fixed format that is universally used for all graphics to be displayed. However, as is well understood to those skilled in the art, changes can be made to the format if required. It is immaterial what type of computer is used for the host computer since the channel adapter 20 is designed to make any adjustments that are necessary in the data to render it compatible with the display system 16.

MCU 22 takes information from the host computer 10 through channel adapter 20 and translates it into information that it can itself utilize and/or pass to the RMEM control unit 24 and the VCU 26. In addition, it generates and sends out function control information which will cause the RMEM control unit 24 to begin writing display information into the RMEM. It also sends out instructions to the VCU 26 to cause it to start reading information out of the RMEM 28 and to transmit such information to CRT 18 for display. VCU 26 also functions to send interrupt signals back to MCU 22 to indicate that it is at the end of a trace of the video scope and to request more information.

In the preferred embodiment RMEM 28 is a 2048×2048 random access memory (RAM) which is adapted to store bits of data corresponding on a 1-to-1 basis to the data contained on a graphic document such as, for example, might be drawn on the board 12. In other words, each storage situs in RMEM 28 could correspond to a unique location on the board 12. However, as will be pointed out below, in the preferred embodiment, part of the RMEM is reserved for non-graphics information such as alphanumerics and miscellaneous notes and instructions. In addition, transformations of stored data, i.e., shifts, zooms, rotations, etc., may be performed by the host computer 10. As illustrated in FIGS. 2a and 2b RMEM 28 is broken up into an array of 16 boards with each board consisting of a 512×512 memory unit. Actually, the memory units are comprised of random access memory chips which have been arranged on 16 boards to be addressed as a square matrix of sixteen 512×512 storage modules. This arrangement allows the memory to be considered somewhat of a map of the graphics information to be displayed.

The primary function of RMEM control unit 24 is to write graphics information into RMEM 28, and the primary function of video control unit 26 is to read out information stored in RMEM 28 and to cause it to be displayed in any of several modes by CRT 18. RMEM control unit 24 receives information from the MCU 22 in the form of a certain number of bytes of data which will tell it to perform certain operations. It then addresses RMEM 28 via X and Y addressing lines contained within the bus 34 and addresses a unique bit in the RMEM 28 and writes either a "1", and "0" or complements (XOR's) the data presently stored at that site via an exclusive OR function. The data transfer from RMEM control unit 24 to RMEM 28 is via the data bus 36. The particular block or blocks of RMEM 28 to be addressed are designated by board select data conveyed via bus 38.

Video control unit 26 reads out and displays in the selected form the information contained in RMEM 28. The data is received in parallel form and converted to serial form for input to CRT 18. Split and zoom control information is conveyed to VCU 26 from microcomputer unit 22 and in response thereto this unit selects and conveys the designated data in RMEM 28 to CRT 18 for display. As indicated previously, every bit in RMEM 28 normally represents one bit to be displayed on the screen, but alternatively, the display can be modified so that every bit stored in RMEM 28 represents some multiple of data positions on the CRT screen. This in effect provides for an expanded or zoomed view of the stored information. Video control unit 26 also generates grid and cursor signals and enables the cursor to be positioned on the screen in any of several splits displayed. VCU 26 conveys one write function to RMEM control unit 24 and that is an ERASE control.

CRT 18 is capable of operating in a raster scan, noninterlaced mode and can display approximately 9 levels of grey. However, the present invention only uses 6 levels of grey; the background is one level, the grid is two levels, the cursor is still another level, the data is a fifth level, and the split margins are a sixth level. These levels are of course effected by different analog voltages applied to CRT 18. The dot resolution of the display screen is 416 dots across a horizontal line and 312 lines in the vertical direction.

Among the novel features of the present invention to be discussed in detail below are its ability to display a selected portion of the data contained in RMEM 28 on either a 1-to-1 scale as compared to the original graphics information, or at any of several predetermined enlarged scales (although not yet included in the preferred embodiment, scale reductions could also be implemented); its ability to cause the display on CRT 18 to appear to pan across the data contained within RMEM 28; its capability of overlying graphics information with additional data without destroying the original information; its capability of splitting the screen, to simultaneously display two or more different areas of RMEM 28; its ability to simultaneously display a background grid which corresponds scalewise to the displayed data; and its ability to make changes or additions to the displayed graphics data without requiring that the entire display be erased and rewritten each time a change is made.

The present display system is essentially an add-on device which can be adapted for use with any computer graphics system so as to take the data format used in the system and convert it into a particular form that can be displayed on a CRT screen rather than on the commonly used direct view storage tube. In addition, it includes expanded controls of information, whereby for example, the data can be split across the screen in the horizontal direction, vertically down screen, or in segments of the screen. The present invention makes it possible to easily modify data and to pan a displayed "window" across the overall graphic layout. It essentially makes it possible to move the equivalent of a window around a very large data base. An instruction to move the "window" to a new position advances the address registers in the video control unit and causes a new section of the memory to be read out and displayed on the screen. This can be accomplished in large steps or it can be done in very small steps to give the illusion of continuous movement over the data base, thus providing a panning motion.

Channel adapter 20 provides the interface to the host computer, and the buffer to the MCU 22, the RMEM control unit 24, and the video control unit 26. It provides a path for high speed data interchange between the host computer 10 and the MCU 22. Whereas the host computer 10 transmits information over the data channels in the form of a binary message, the MCU 22 is programmed to recognize the data and set up the CRT screen to display the selected splits, the proper zoom factor and the data in the selected area of RMEM 28. The data is then input to the RMEM 28 through RMEM control unit 24 and video control unit 26 is caused to constantly read RMEM 28 and display the select portions of the data on CRT 18.

Once the data is input to RMEM 28, MCU 22 has no further function to perform on the data, but any time that the video control unit 26 needs additional information, it will, during the CRT retrace period, interrupt MCU 22 and request the needed information. MCU 22 will then process the information and update VCU 26. During the time following the loading of VCU 26, MCU 22 can supply the control information to RMEM control 24. For example, if data is input to the system from the host computer 10 instructing it to go to some position X-Y and to draw a line of a certain character, this information will be digested by MCU 22 and corresponding instructions will be issued and input to the RMEM control unit 24. The RMEM control unit 24 will go BUSY and will perform its function and input data to RMEM 28 until its instruction is complete.

As will be explained in more detail below, data can be input into RMEM 28 in either of two modes: the first is in effect where it draws a line into the memory; the second is where it draws a solid block of data into the memory in what is identified as the zig-zag mode of operation. The zig-zag mode is primarily used to input alphanumeric information. However, it could be used to draw a rectangular block of any type of data. For example, the RMEM control could be set up to zig-zag through an area of memory P number of bits in the X direction and Q number of bits in the Y direction.

Turning now to FIG. 3 of the drawing, the principal operative components of channel adapter 20 are illustrated in block diagram form and include the direct memory access (DMA) address registers 50, a computer channel control module 52, a bidirectional data buffer and control module 54, a data buffer 56, a tristate data buffer 58, a device decode module 60, and a buffer 62. As indicated peviously, this unit is designed to fit the particular type of host computer that is used with the system. The DMA address registers 50 are coupled to the host computer 10 through a computer DMA address bus 11. The channel control unit 52 and bidirectional data buffers and control unit 54 are coupled to the host computer by a computer data and I/O control bus 13. The external CPU address bus 30 communicates with the channel adapter 20 through the device decode module 60 while the external CPU data bus 32 communicates with the channel adapter 20 through the data buffer 56 and tristate data buffer 58. Channel adapter 20 also communicates with MCU 22 via buffer 62 and bus 33.

The units 50, 52, and 54 primarily perform the function of receiving data from the host computer and breaking it down into a suitable format for input to MCU 22, and conversely, perform the function of converting MCU data to the host computer data format. The DMA address registers 50 permit the present system to communicate with host computer 10 using cycle/stealing techniques so as not to interfere with its operation. This prevents the host computer from constantly having to "handshake" with the present display system. As a result the host computer 10 can easily handle up to sixteen display systems simultaneously.

In order to accomplish an interchange of data, host computer 10 can merely deposit information into a specific location in its memory and alert the display system to that deposition. The present system can then periodically communicate with the host computer's memory to update and otherwise use the information. This permits computer 10 to be used by other devices for other purposes while the present system is simultaneously hooked up to it and is using it. Accordingly, computer channel control unit 52 is primarily comprised of logic dictated by the demands of the two computers and functions to control the bus going from MCU 22 to the host computer 10. This prevents the display system from attempting to use the bus 13 when host computer 10 is using it for some other purpose internally. Conversely, it prevents host computer 10 from interferring with operation of the MCU buses.

The tristate data buffer 58 is a device which permits data to be both sent and received over the same bus without imposing a load on either the sending or receiving end when no data is being transferred.

Device decode unit 60 operates to decode both data in and data out of the channel adapter so as to enable MCU 22 to provide certain specified operations. Device decode 60 also functions to alert a particular component of the system that information is coming down the line and is for that particular component. It also serves to notify a particular component that it should send information back out.

Buffer 62 operates in conjunction with the bidirectional data buffer 54 to determine whether or not the tristate data buffer 58 can be actuated to transfer data between host computer 10 and MCU 22. Unit 54 also determines whether the data coming in is specifically for the computer channel control unit 52 and if so, loads it directly thereinto or loads it into the DMA address registers 50 or the bidirectional data buffers. Unit 54 is comprised of a set of tristate buffers along with various control logic and storage registers.

In FIG. 4 of the drawing, the principal components of MCU 22 are illustrated. This unit includes three buffers, 70, 72, and 74, which serve as level translators and isolators for a central processing unit (CPU) 76. The buffers serve to isolate any externally caused perturbations from the CPU. In the preferred embodiment the CPU 76 is comprised of an INTEL 8080 Microprocessor but any other suitable type of microprocessor, microcomputer, minicomputer, computer, or even hardwired logic could alternatively be used in place of the 8080, the main consideration being speed of picture modification versus cost of the computer.

The status latch 78 is comprised of a series of commercially available latching devices and is used in monitoring the CPU data bus. The CPU memory read/write (R/W) and refresh unit 80 is comprised of a number of small scale integrated circuits which are used to monitor the CPU data bus, the CPU status, and the external memory control. If for example, it becomes necessary for the CPU to take some particular byte of information out of its memory, it will pass such information to the read/write and refresh circuit via the bidirectional data buffer 82 and the data bus 32. Such information will also pass to the CPU memory 84 through the data bus 32 and cause the desired information to be read out of the memory back through data bus 32 and bidirectional data buffers 82 to the CPU 76 where it will be digested. If during a particular interval T1 of its cycle (such period being defined in the device operation manual Intel 8080 Microcomputer System Manual January 1975). CPU 76 needs information from the memory 84, such information will be output in the status word and the R/W and refresh unit 80 will go to the memory 84 via the address that is sent out at the same time on the data bus 32. It will then address certain ones of the bytes of memory 84 and cause them to be passed back out via the bidirectional bus 32 and through the bidirectional data buffer 82 to CPU 76. CPU 76 will then digest the information internally and proceed with its function for that cycle. Being a dynamic RAM, memory 84 must be refreshed. This is accomplished by the refresh logic in unit 80 by incrementing the refresh address register 86 and actuating the memory address multiplexer 88 so that it selects the output of register 86 which in turn cycles the memory 84 once. In other words, following every T1 input of the requested data to CPU 76, the R/W and refresh unit 80 will cause memory 84 to be refreshed. Although memory 84 is constantly being read by CPU 76, it is also being refreshed on a cycle sharing basis by the refresh unit 80. The specifications for how rapidly the refresh operation must be accomplished is dictated by the particular RAM used for the memory.

The memory address multiplexer 88 predominantly couples the external CPU address bus and memory address lines, but since the memory 84 must be periodically refreshed, there must be some way to periodically disconnect the address bus from the input to memory 84 and instead connect the refresh address register 80 thereto. This is precisely the role that address multiplexer 88 plays in response to a refresh signal developed on line 89. The refresh address registers 86 are a series of registers that increment from 0 through 64 and continuously cycle to refresh CPU memory 84. Tristate address buffer 90 enables CPU 76 to address a particular location in its memory 84 but prevents the CPU from being loaded by an external signal on address bus 30.

The major operative components of RMEM control unit 24 are shown in block diagram form in FIG. 5a of the drawing. As indicated, the components include a CPU data buffer 100, a busy logic unit 102, a device decode unit 104, a buffer 106, and a subassembly enclosed within the dashed lines 108 generally including RMEM control registers and read-modify-write control logic. In addition, a 16-to-1 bit multiplexer 110, address registers 112, refresh address registers 114, a one-of-sixteen select or erase 16 module 116, a tristate data buffer 118, and a tristate 2-to-1 multiplexer 120 are included in RMEM control unit 24. Subassembly 108 includes a zig-zag and bit stream control logic unit 122, an octant control register 124, an X-Y address register count control unit 126, a data direction buffer register 128, a data direction shift register 130, a write control register 132, and a bit modifier ROM 134.

Data buffer 100 merely isolates CPU 76 from this unit so that any perturbations in either unit will not get back to the other. The busy logic unit 102 performs a programming function to synchronize the sending of data from the MCU 22 to the RMEM control unit 24. The operating CPU program will instruct the RMEM control unit to modify a certain bit or number of bits of data in some fashion, and when it gives that instruction, it must be able to isolate itself and not be interrupted until its operation is finished. In other words, once an instruction is issued, a busy flag will be set to prevent the CPU from issuing further instructions until the RMEM control unit is finished modifying the particular bit or bits designated. However, following completion of the operation, the busy flag will be reset to enable the CPU to again issue instructions. The busy logic 102 essentially serves the RMEM control unit's handshaking logic with the CPU to indicate that the RMEM control is either busy or able to receive further instructions.

The device decode unit 104 includes one or more commercial decoders which are connected to the external CPU address bus 30 and which function to decode a signal input thereto, and select a particular output device for receiving data communicated over the data bus 32. For example, if the decoded output of unit 104 were to in effect be "output device X" where X is one of several devices included within unit 108, that device will be enabled and data on the data bus 30 will be input thereto. In other words, through this decoding operation it is made possible for CPU to load all of the necessary control information out to the RMEM control unit and into the respective control or address registers of unit 24.

The particular decoding scheme utilized in the preferred embodiment is given in Table 1.

TABLE 1

RMEM CONTROL UNIT CONTROL REGISTER ASSIGNMENTS

| Device Codes | Buffered 8080 Data | | | | | | | | |
|---|---|---|---|---|---|---|---|---|---|
| | D7 | D6 | D5 | D4 | D3 | D2 | D1 | D0 | |
| DEVO 70 | X7 | X6 | X5 | X4 | X3 | X2 | X1 | X0 | This device code will load the lower 8 bits of the X address register (112) as assigned. |
| DEVO 71 | — | — | — | — | X11 | X10 | X9 | X8 | This device code will load the upper 4 bits of the X address register (112) as assigned. |
| DEVO 72 | Y7 | Y6 | Y5 | Y4 | Y3 | Y2 | Y1 | Y0 | This device code will load the lower 8 bits of the Y address register (112) as assigned. |
| DEVO 73 | — | — | — | — | Y11 | Y10 | Y9 | Y8 | This device code will load the upper 4 bits of the Y address register (112) as assigned. |
| DEVO 74 | — | — | — | all-out | $Z_{Z_M}$ | WRT/XOR | — | WRT/ERS | This device code will load the WRT control register 132 as assigned. |
| DEVO 75 | BIT STRM | — | XUD | XA0 | XA1 | YUD | YA0 | YA1 | This device code will load the octant control register 124 as assigned |

| FUNC | D2 | D0 |
|---|---|---|
| WRT BLOCK | 0 | 0 |
| XOR | 0 | 1 |
| ERASE | 1 | 0 |
| WRT 1 | 1 | 1 |

Only applies when in zig-zag mode (ZZM).

1 = zig-zag mode

1 = allout mode

1 = Bit stream mode

Y act on 1: 1 = act if D/D7 = 1, D/D7 = 0, NOP

Y act on 0: 1 = act if D/D7 = 0, D/D7 = 1, NOP

Y direction: 1 = UP, 0 = DWN

TABLE 1-continued

RMEM CONTROL UNIT CONTROL REGISTER ASSIGNMENTS

| Device Codes | Buffered 8080 Data | |
|---|---|---|
| DEVO 76 | D7 D6 D5 D4 D3 D2 D1 D0<br>DATA<br>D/D7: Data is shifted out left, 0 fill | This device code will load the data/direction register 128 as assigned |
| DEVO 77 | D7 D6 D5 D4 D3 D2 D1 D0<br>YL7 YL6 YL5 YL4 YL3 YL2 YL1 YL0 | This device code will load the Y length counter of logic (122) as assigned.<br>Note: This counter is used in zig-zag mode only. |
| DEVO 78 | D7 D6 D5 D4 D3 D2 D1 D0<br>BS7 BS6 BS5 BS4 BS3 BS2 BS1 BS0 | This device code will load the Bit stream length counter of logic (122) as assigned.<br>Note: This counter is used for X length in zig-zag mode only. |
| DEVO 79 | D7 D6 D5 D4 D3 D2 D1 D0<br>EVEN ODD SK5 SK4 SK3 SK2 SK1 SK0<br>SKP bit MOD on ODD main axis<br>SKP bit MOD on EVEN main axis | This device code will load the skip memory address register (154) as assigned. |

Coming out of the X-Y address registers 112 is a 24-bit bus 113 with an 8-bit bus going into tristate buffer 118. Similar tristate buffer in the video control unit 26 allows the use of the same line for communication with the RMEM 28. The 2-to-1 multiplexer 120 is a tristate device which has 12 lines driving it from the XY address register 112 and 6 lines are input from the refresh address register 114. The bus 140 includes approximately 30 lines going in both directions. Some lines handle control signals from the RMEM control unit 24 to the video control unit 26 and some handle RMEM control signals being returned to the RMEM control unit. The bus lines 140 set up the priorities for use of the bus 142 which is used in common by the RMEM control and the video control units.

The 144 bus is a 7-line bus which selects those portions of the RMEM to be addressed by the registers 112. The address registers 112 address a word of 16 bits in length within RMEM 28. The 16-to-1 bit multiplexer 110 serves as a data output bit selector which enables a particular bit of the 16-bit word to be selected for modification. The types of modification which can be executed are (1) to force the bit to assume a "1" status which in a normal display mode will show up as a dark dot on a white background, (2) "erase," which will make the dot go to a background color (if the background is white, then it becomes a white dot or disappears), and (3) XOR the dot if the screen presently has a black spot on it (an XOR of a black spot, a logic "1", will cause the spot to go white, a logic "0", and conversely if the spot is white and it is XORed the white spot will go black). These write controls are performed by a bit modifier ROM 134 which is coded as described in Table 2.

TABLE 2

BIT MODIFIER ROM CODE

| | | | | | | DEVO 74 | | | | |
|---|---|---|---|---|---|---|---|---|---|---|
| | | | ZZM | D/D7 | DATA IN | BIT 2 | BIT 0 | | | DATA OUT |
| | 0 | 0 | 0 | 0 | 0 | 0 | 0 | WRT BLOCK | (NOP) | 1 |
| | 1 | 0 | 0 | 0 | 0 | 0 | 1 | COMP | (XOR) | 0 |
| | 2 | 0 | 0 | 0 | 0 | 1 | 0 | ERASE | | 1 |
| | 3 | 0 | 0 | 0 | 0 | 1 | 1 | WRT 1 | | 0 |
| | 4 | 0 | 0 | 0 | 1 | 0 | 0 | WRT BLOCK | (NOP) | 0 |
| | 5 | 0 | 0 | 0 | 1 | 0 | 1 | COMP | (XOR) | 1 |
| | 22 | 0 | 0 | 0 | 1 | 1 | 0 | ERASE | | 1 |
| | 7 | 0 | 0 | 0 | 1 | 1 | 1 | WRT 1 | | 0 |
| $\overline{ZZM}$ | #0 | 0 | 1 | 0 | 0 | 0 | WRT BLOCK | | (NOP) | 1 |
| | 9 | 0 | 0 | 1 | 0 | 0 | 1 | COMP | (XOR) | 0 |
| | 10 | 0 | 0 | 1 | 0 | 1 | 0 | ERASE | | 1 |
| | 11 | 0 | 0 | 1 | 0 | 1 | 1 | WRT 1 | | 0 |
| | 12 | 0 | 0 | 1 | 1 | 0 | 0 | WRT BLOCK | (NOP) | 0 |
| | 13 | 0 | 0 | 1 | 1 | 0 | 1 | COMP | (XOR) | 1 |
| | 14 | 0 | 0 | 1 | 1 | 1 | 0 | ERASE | | 1 |
| | 15 | 0 | 0 | 1 | 1 | 1 | 1 | WRT 1 | | 0 |
| | 16 | 0 | 1 | 0 | 0 | 0 | 0 | WRT BLOCK | | 1 |
| | 17 | 0 | 1 | 0 | 0 | 0 | 1 | COMP | | 1 |
| | 18 | 0 | 1 | 0 | 0 | 1 | 0 | ERASE | (NOP) | 1 |
| | 19 | 0 | 1 | 0 | 0 | 1 | 1 | WRT 1 | | 1 |
| | 20 | 0 | 1 | 0 | 1 | 0 | 0 | WRT BLOCK | | 1 |
| | 21 | 0 | 1 | 0 | 1 | 0 | 1 | COMP | | 0 |
| | 22 | 0 | 1 | 0 | 1 | 1 | 0 | ERASE | (NOP) | 0 |
| ZZM | 23 | 0 | 24 | 0 | 1 | 1 | 1 | WRT 1 | | 0 |
| | 124 | 0 | 1 | 1 | 0 | 0 | 0 | WRT BLOCK | | 0 |
| | 25 | 0 | 1 | 1 | 0 | 0 | 1 | COMP | (XOR) | 0 |
| | 26 | 0 | 1 | 1 | 0 | 1 | 0 | ERASE | | 1 |

TABLE 2-continued

| | | | | BIT MODIFIER ROM CODE | | | | | |
|---|---|---|---|---|---|---|---|---|---|
| | | | | | DEVO 74 | | | | |
| | | ZZM | D/D7 | DATA IN | BIT 2 | BIT 0 | | | DATA OUT |
| 27 | 0 | 1 | 1 | 0 | 1 | 1 | WRT 1 | | 0 |
| 28 | 0 | 1 | 1 | 1 | 0 | 0 | WRT BLOCK | | 0 |
| 29 | 0 | 1 | 1 | 1 | 0 | 1 | COMP | (XOR) | 1 |
| 30 | 0 | 1 | 1 | 1 | 1 | 0 | ERASE | | 1 |
| 31 | 0 | 1 | 1 | 1 | 1 | 1 | WET 1 | | 0 |

In Table 2 the vertical column designated "ZZM" represents the logic states of signals developed on the "3" output of write control register 132, "D/D7" represents the signals input to ROM 134 from shift register 130 on line 111, "Data In" represents the signals input from multiplexer 110 on line 107, and "Bit 2" and "Bit 0" represent the signals input from the least significant bit positions of write control register 132. The column entitled "Data Out" represents the modified data output by ROM 134 on line 109. The first 16 codes correspond to nonzig-zag mode operations, while the second sixteen codes correspond to zig-zag mode operations.

When operating in the normal write mode ROM 134 takes data in on its line 107 from multiplexer 110 and by its code and code received from the write control register 132 determines whether or not it will modify the data out on line 109, totally ignore the data, and put out a "1" or a "0," or look at the data in and send out modified data out which is opposite thereto, i.e., is XORed.

In operating in the zig-zag mode, an entire block of data contained within the memory may be modified. This mode allows the modification of a particular block of data which only need be addressed at its upper left-hand corner. Once addressed, the zig-zag mode control electronics causes the memory to be addressed starting at a particular X-Y location identifying the upper left-hand corner of the block and to count down in the Y direction until it reaches the end of the Y count specified and then increment the X count by one, count up in the Y direction until it reaches the specified Y count, increment the X count by one, count down in the Y direction, etc., until both the X and Y lengths of the block are exhausted, at which time the operation is stopped. This allows the drawing of a zig-zag of lines through the memory to paint in the block.

For example, using a zig-zag mode block the letter A could be made in a small size, e.g., a matrix of $5\times7$ bits, or could be made the size of the entire display screen. However, if an alphanumeric-coded ROM chip were used, the $5\times7$ matrix could not easily be expanded to make it cover the entire display screen. Accordingly, with the scheme of the present invention, there is no limitation as to the size of the alphanumerics. The only limitation is that should the stored numerics be too small, for example, smaller than $3\times3$ bits, it would be difficult to properly portray the character. Accordingly, nearly total freedom of size of the alphanumeric character painted on the screen is permitted and this mode makes it reasonably easy for the control program of the MCU to generate such characters. In this mode, the same data can also be used to generate either a black character on a white background or a white character framed by a black background by just drawing a black rectangle and XORing the matrix character data.

An additional advantage of the XORing capability of the present invention is that if a character line or shaded block is written over another line or another figure the erasure of the character will cause the other line or figure to reappear. For example, one may choose to put in text over a drawing with the text overlapping some of the lines in the drawing. The only effect would be that where a line crosses the data it would be complemented; however, upon removal of the text the original drawing would be reconstituted to its original form. This is a major advantage of the present invention.

Data direction buffer register 128 is a holding register which permits the information in register 130 to be used and reused without destroying it. Such register is required for operation in the bit stream mode so as to enable the data direction shift register 130 to be loaded only once by the CPU but to be used over and over.

The zig-zag and bit stream control logic 122 includes an 8-bit register 121 which receives the Y length from data buffer 100 and a second 8-bit register which receives the X length from buffer 100. The combination of these two registers indicates the maximum area that is to be covered by the zig-zag mode operation. In other words, how large the area is in the X direction and how large it is in the Y direction. When the zig-zag operation begins, it starts at the upper left-hand corner of the stored data.

The information contained in register 123 serves a dual purpose. In the zig-zag mode it provides the X length of the zig-zag block; however, in the bit stream mode, it indicates how many bits of information are to be modified. For example, a count of one in register 123 will cause only one bit of information to be modified after which CPU 22 will be notified that the operation is complete. Likewise, if the count is 8 then following modification of those 8 bits CPU 22 will be notified that the operation is complete.

The X-Y address register count control unit 126 is loaded with information from both zig-zag and bit stream control unit 122 and octant control register 124. The bus 127 coupling unit 122 to unit 126 includes a zig-zag mode Y-up line, a zig-zag mode Y-down line, and a zig-zag mode X-up line. The Y-up line when raised instructs count control 126 to count the Y register up, the Y-down line when raised instructs the register to count the Y register down and the X-up line when raised causes the register to count the X register in the up direction. There is no X-down for the zig-zag mode.

The octant control register 124 is loaded with data on data bus 33 in response to a control received from device decode unit 104 on line 119. The 6 least significant bits of this register will control when the apparatus is not operating in the zig-zag mode, i.e., will indicate how the X-Y address registers 112 are to be counting. For example, are they counting in the Y-up, Y-down, or the X-up, X-down directions.

The most significant bit of register 124 is output on line 125, and when that bit is set, it causes unit 122 to operate in the bit stream mode. Another of the bits out of control register 124 is the X up/down (Xu/d) bit which when set/cleared indicates that the register is to count in the up/down direction. When the bit designated XA0 is set, it will cause the X register to count up or down depending on the state of the Xu/d bit in register 124 if there is an "0" on bus 111, i.e., XA0 means act on a zero on bus 111 as specified by Xu/d. Conversely, XA1 means act on a "1" on bus 111 as specified by Xu/d. If both bits are set, then there will always be a command to act on the X register depending on the state of Xu/d. The Yu/d has the same control function relative to the YA0 and YA1 bits as the XA0 and XA1 has to the Xu/d.

The purpose of this function is not just to allow a unique bit to be addressed in the RMEM 28 but to allow the control program of the CPU 22 to indicate that it wishes to modify a certain number of bits in the RMEM, and it wants to start at a particular address and go in any direction from that point. This makes it possible to draw any connected figure without giving any more X and Y addresses. Accordingly, substantial time is saved because whereas a reloading of X, Y, coordinates requires 32 data bits, the above method only uses one data bit. Thus, the octant control register 124, in conjunction with the data direction register 130, will permit, under the control of the Xu/d and its associated X actions and the Yu/d and its associated Y actions, a counting of the X-Y address registers, and under control of the write control, register 132 will modify a bit at the location arrived at by the action just described.

The skip pattern control unit 138 responds to the address and data inputs to produce a signal on line 115 for input to unit 116 which will inhibit the RMEM bit modify operation in a specified pattern. This operation simplifies the generation of a wide variety of broken lines to be written into RMEM 28. The use of broken lines in mechanical drawings is one application of such use; another is two lines that are coincident as in a printed circuit board top and bottom view. When the latter is drawn as two different patterns, the overlaying of the two lines will be distinct from the two lines not overlayed.

Briefly, the skip pattern control unit 138, which is shown in more detail in FIG. 5b, includes an 8-bit memory unit 150 that has the pattern in it as a series of 7-bit count values which will be accessed and loaded into a counter 152 that is counted overflow. At overflow, the 8th bit of the memory is examined and if it is a "1", this terminates the pattern and the skip pattern memory address in register 154 is set back to the value that was loaded by MCU 22. If the 8th bit is "0", the skip pattern memory address register 154 will be incremented by one and a new count value will be loaded into counter 152.

The inhibit input (on line 115) to unit 116 is set to not inhibit by MCU 22 when it loads the skip pattern starting address into register 154. After that, every count overflow will cause logic unit 156 to toggle the inhibit signal flip-flop 158 ON and OFF until an 8th bit equal to "1" is found. At that time the inhibit signal is set to not inhibit. This pattern will continue until the MCU 22 sets a new starting address. The counter 152 is incremented by one for every RMEM bit modify attempt.

Therefore, it can be seen that by having a series of count values in the skip pattern memory, the last one of which is the 8th bit equal to "1", it is possible to write a line in RMEM 28 that has a variable modulo of missing bits. The result of this operation is shown in FIG. 2e for the skip pattern memory values shown in FIG. 2f.

To overcome the problem of erasing a figure from the RMEM and having an overlapping figure partially erased, a modulo 2 skip technique can be incorporated wherein lines can be written as a series of dots occupying only the even (or odd) storage locations. If this is done, that line will never conflict with another overlying line written only on odd (or even) storage locations.

As indicated in FIG. 5b, the MCU loads the modulo 2 holding register 160 via bus 33 to create an even skip (remainder=0), odd skip (remainder=1), or no skip. Using the X, Y addresses on lines 113 the major mux unit 162 selects either the X axis or the Y axis as the major axis according to the value of the X-Y major signal developed on lines 164 by octant control register 124. The modulo 2 remainder logic 166 divides the major axis value by 2 and outputs its remainder for comparison with the output of register 160. The comparator 168 develops a modulo inhibit signal on line 169 when the remainder has a value called for by the modulo 2 remainder holding register 160. This modulo inhibit signal is ORed with the skip pattern inhibit in gate 170. The scheme is easily expandable to modulo N=3, 4, etc.

The present invention is frequently used to lay out printed circuit board designs wherein circuit layouts are made on both top and bottom of the board. This feature thus has particular applicability in that it enables the lines on both sides of the board to be depicted in a single display without any conflict.

More particularly, by assigning even storage locations to the top of the board and odd storage locations to the bottom side, a top circuit line and a bottom circuit line can coincide and each be independently modified or erased without affecting the other. This is a very appropriate application for PCB design because wires on the same side of the board do not ever cross or coincide. This feature could also be generalized for three sides or more by using modulo arithmetic.

Since the RMEM is two-dimensional and since the present invention deals with stick figures made of straight line segments (even cirles are made of straight line segments), either the X or Y direction is chosen as the major axis simply by using the larger delta distance. More precisely, if a line segment has end points $X_0$, $Y_0$, and $X_1$, $Y_1$, the major axis is X if $|X_0-X_1| \geqq |Y_0-Y_1|$ otherwise Y is the major axis. The skipping of odd or even dots takes place with respect to the value along the major axis. The result of this operation is shown in FIG. 9 wherein rectangles and lines are drawn at A, B, and C to illustrate, respectively, a no skip application, an even skip application, and an odd slip application.

In FIG. 6, a block diagram is presented showing the principal components of the video control unit 26 excluding many of the various timing control blocks. The function of video control unit 26 is to address RMEM 28, read data therefrom, take the 16 bits of parallel data, convert it into serial form, and then through a video mixer 150 drive the CRT 18. This particular unit includes the basic oscillator and sync circuits for the display system. In the center of the diagram the block 152 entitled "Oscillator and Video Sync Circuits" includes a 40 MHz oscillator and a number of rather straight forward counters which divide down the output of the oscillator into the various specified horizontal and vertical retrace signal frequencies and timing frequencies needed for operation of the CRT in a raster-scan, noninterlaced mode. For example, since the device must generate 416 dots (picture elements) for each line drawn across the CRT screen and there are to be 312 lines from top to bottom of the screen, this number of elements makes up a 1- to-1 look at a particular area of RMEM 28. So in essence, in the 1-to-1 zoom mode every bit of data in the scanned area of the RMEM will correspond to a dot on the CRT screen which is either illuminated or not illuminated.

The bits read out of the RMEM are fed into a buffer register 154 under control of the RMEM read/write control and timing unit 156 which controls access to the RMEM according to the specifications of the particular chips used therein. Each time it is ready to receive data it will generate a load signal for input to the buffer register 154. And after the buffer is loaded and settled unit 156 will generate a shift signal for input into the first-in first-out (FIFO) unit 158. The FIFO 158 is a device which will upon receipt of the shift signal receive 16 bits from the buffer register 154 and cause those bits to automatically propagate to the output end of the register so that they can be taken out independent of the speed at which new blocks of data are input to the FIFO. This is required in this case because in real time there is a unique time within which the date must be taken out and read onto the screen. But at the same time, words must constantly be reloaded into the buffer 154 so that the FIFO does not go empty during a display line. The FIFO's characteristic of allowing certain slack times eliminates any possibility of conflict between input and output of data.

The video dot clock generator 162 controls the data readout on a dot-by-dot basis to develop each horizontal line displayed. It causes the output of FIFO 158 to be generated in real time as a function of the selected zoom, and in addition generates dot cycle control signals on line 163 for input to gate 167. Generator 162 is driven by the sync circuits 152 by means of signals input over the bus 153. Bit counter 164 responds to the output of generator 162 and develops a shift out from the FIFO and a load to the buffer register 160. The bit counter output on line 165 performs the same function in the horizontal direction that the zoom control ROM 170 performs in the vertical direction, namely, for a zoom of say 2, the dot (in the memory) in the horizontal or X direction is expanded to two dots so that the data in register 166 is shifted out only every other dot time. Similarly, the dot duty cycle signal on line 163 performs the same function in the horizontal direction that the zoom control ROM performs in the vertical direction, namely, for a zoom of two and a 50% dot duty cycle, a particular dot is only allowed to be displayed for one dot period.

If counter 164 has been set to zero, then converter 166 will first output the least significant bit of the 16 bits contained therein. This means that if a particular frame falls on a word boundary there will be no offset. However, if the device is to be capable of scanning the video display smoothly through the RMEM, it must have the capability of being able to cross word boundaries, and this can only be done on an offset basis insofar as the very first word is concerned. This in effect means that the data transmitted to video mixer 150 must start with a particular bit selected, such bit not necessarily being the first bit in a word, and the rest of the 16-bit word must likewise be displayed serially. The next 16-bit word is then received from the FIFO 158 and the bits are displayed serially until the split is reached at a bit count specified in the X-Y split logic 178. This operation is repeated for each X split (one or two allowed) and for each video line.

The data control logic 167 gates the output of converter 166 under control of the inhibit signal from zoom control ROM 170 and the dot duty cycle signal from generator 162. The video hashing logic 169 gates the data output from logic 167 with a 10 MHz signal generated by the sync circuits 152.

The zoom control ROM 170 is used to control data displayed in the vertical direction and has the effect of causing the data read out to correspond to something other than a 1-to-1 dot position on the screen. For example, it may cause a single dot in the memory to represent 3 dots on the screen. It gets information (control word 2) from the V1 and V2 control memories 172 and 174 at the top of the figure, another set of inputs from the vertical line counter of the oscillator video and sync circuits 152, another set of inputs which are generated by the V1–V2 read/write control unit 176, and still another set of inputs from the modulo 3 counter 171. The buses leading into the zoom control ROM wil set up its address register so that a zoom of any particular magnification can be specified. More precisely, the zoom ROM inputs an 8-bit address formed as follows: 3 bits of zoom value (from control word 2), 1-bit dot duty (100% or 50% from control word 2), 2 bits from the mod 3 counter, and the 2 least significant bits of the vertical line counter.

The ROM has two outputs used for control purposes. One of the outputs is called "inhibit data." Its function is to inhibit the FIFO data output on a line-by-line basis as a function of the zoom/dot duty cycle. For example, a zoom of two with a 50% duty cycle will cause every other line to be inhibited. Since a zoom of two implies a dot in the memory has been expanded to two dots both in the horizontal as well as vertical direction, and a 50% duty cycle implies that the dot is to be only on for one dot period in both the horizontal and vertical directions, then the "inhibit data" line would inhibit the FIFO data on every other line. The other control output is "inhibit Y address count." For the previous example, it would not allow the Y address to be incremented every line but rather every other line, since the data to be displayed has been expanded to two dot positions in both the horizontal as well as vertical directions.

One of the problems, however, is that if a single dot in the memory is to correspond to two dot positions in the X and Y directions on the screen, the simple result will be a very large dot. Accordingly, the zoom control logic contains registers that specify zoom magnification and separately specify the optimum dot duty cycle. In other words, a selectible range is provided for allowing the dot to be on for two normal dot periods or to be on for only one dot period. This scheme is obviously expandable to more than two periods. If it is set to be on for just one period, it will reproduce a single dot. For example, if a horizontal straight line is magnified to a zoom of two with a single dot duty cycle, it will appear as a series of dots twice as long as the original line. But if a two-dot duty cycle is selected, the larger dots will merge and will appear as a solid line twice as thick and twice as long as the original line. Basically, this function of the zoom control logic, in effect, says how is this particular magnified information to be represented? Is it to be represented as produced, basically with a 100% duty cycle, or is it to be represented as produced by a 50% of other duty cycle? Internally, the zoom control includes a large quantity of logic which enables it to perform such function.

TABLE 3

| V1 MEMORY OR V2 MEMORY WORD ASSIGNMENTS | | | | | | | | | |
|---|---|---|---|---|---|---|---|---|---|
| DATA | | | | | | | | ADDRESS | |
| 7 | 6 | 5 | 4 | 3 | 2 | 1 | 0 | | |
| | | | | $X_{11}$ | $X_{10}$ | $X_9$ | $X_8$ | 0 | X ADDRESS |
| $X_7$ | $X_6$ | $X_5$ | $X_4$ | $X_3$ | $X_2$ | $X_1$ | $X_0$ | 1 | |
| | | | | $Y_{11}$ | $Y_{10}$ | $Y_9$ | $Y_8$ | 27 | Y ADDRESS |
| $Y_7$ | $Y_6$ | $Y_5$ | $Y_4$ | $Y_3$ | $Y_2$ | $Y_1$ | $Y_0$ | e | |
| ERS | REV | $V_2$ | | # of X Words | | | | 4 | CONTROL WORD 1 |
| $X_6$ | $X_6$ | $X_5$ | $X_4$ | $X_3$ | $X_2$ | $X_1$ | $X_0$ | 5 | X CURSOR |
| $Y_7$ | $Y_6$ | $Y_5$ | $Y_4$ | $Y_3$ | $Y_2$ | $Y_1$ | $Y_0$ | 6 | Y CURSOR |
| Xs8 | Xs7 | Xs6 | Xs5 | Xs4 | Xs3 | Xs2 | Xs1 | 7 | X SPLIT |
| Ys8 | Ys7 | Ys6 | Ys5 | Ys4 | Ys3 | Ys2 | Ys1 | 8 | Y SPLIT |
| Yoff | $Y_8$ | Xoff | $X_8$ | Ds | | Zoom | | 9 | CONTROL WORD 2 |
| | | | | | | | | A | |
| | | | | | | | | B | |
| | | | | | | | | C | |
| | | | | | | | | D | |
| | | | | | | | | E | |
| | | | | | | | | F | |

As indicated in Table 3, by the use of a particular set of word assignments for the V1 memory 172 and V2 memory 174, certain operations can be accomplished. More specifically, an X address and a Y address can be specified at which the device will start reading in the RMEM and displaying the data. A first control word (Address No. 4) is provided to cause the data to be displayed in the reverse field, or to erase information from the RMEM 28 or to have a split where the rest of the line is specified by V2, and the five least significant bits of the control word specify how many 16-bit RMEM words are to be displayed. If a times 1, no-zoom type of display is being made, 416 dots are allowed across the screen. And since an RMEM word corresponds to 16 dots, 26 RMEM words ($26\times16=416$) are displayed in one line across the screen. However if a 2-to-1 zoom is to be executed, the number 13, i.e., 26 divided by 2 would be inserted, etc. The apparatus also has the capability of positioning a cursor on the screen, and it is given an X and Y count as indicated by address positions 5 and 6. The seventh and eighth address positions provide for X and Y splits of the screen. These words allow values for X and Y to be set so that if, for example, the number 256 is input for the X split, when the screen has been scanned 256 bits under control of the V1 memory, the screen will be blanked for several bits and control will switch from the V1 memory to the V2 memory which may cause information from an entirely different portion of the memory to be displayed over the remainder of the line with independently selected zoom factor, dot duty cycle, normal/reverse field, cursor, and background grid. At the end of each horizontal retrace line, control switches back to the V1 memory.

The V1 and V2 control memories have exactly the same capability of X-Y addressing and both operate through the X-Y address registers 184. But the V2 does not have the capability of generating another X split. So what is permitted is to have one set of X-Y addresses in the V1 memory, set up an X split and when that X split position is reached, cause the output to skip over to the V2 memory which will have a unique X and Y address different from the V1 X and Y address. This means that the V1 memory will control scanning over one portion of the display and the V2 memory will control scanning over another portion thereof. And the represented portions of data can be taken from different portions of the RMEM. The same thing holds true for the Y split. There are 312 lines in the Y direction, and if, for example, the number 42 is selected for address word 8, it will cause the screen to be blanked for a period of time following line 42, and cause MCU 22 to be alerted, via interrupt logic 182, that a Y split has been reached. The MCU will then reload the V1 and V2 memories with new data, which could call for an X split or any of the before-mentioned operations, the display will be unblanked and scanning will continue until another Y split or end of display frame (vertical retrace), at which time another interrupt signal will be sent to MCU 22 via interrupt logic 182. Address 9 is control word 2. This word contains four cursor extension bits, i.e., Y offset, $Y_8$, X offset, $X_8$ as well as the dot size (DS) and zoom control words. The dot size and zoom can give a one-to-one representation or any other combination of zoom and dot size as previously mentioned. So in other words the V1 and V2 control memories contain all of the information necessary for enabling the desired operation to be selected and carried out.

The X-Y split logic 178 receives inputs from the V1 control memory 172, the V2 control memory 174, some clock signals from oscillator 152 and some read/write control signals from V1/V2 read/write control 176. This logic contains various counters which under the control of the V1/V2 read/write control select information either from the V1 control memory or the V2 control memory. The X-Y split logic will also generate a signal for the Y split which is coupled through a single line 180 to the interrupt logic 182. During the Y split, the MCU 22 can be flagged by an interrupt line, and it will have more than enough time to reload the V1/V2 control memories.

The reason for the V1 and V2 control memories is because of the X split. The X split is a real time operation requiring very fast response. For example, it takes only about 50 microseconds to scan the 416 dots in a line in the X direction. The CPU takes at least 5 microseconds to do almost anything, so it is quite clear that it would be impossible to take the data directly from the CPU for the X split. THe V1 and V2 control memories thus perform the X split without bothering the MCU 22. But on the Y split, there is plenty of time for the MCU 22 to perform its function, and an interrupt signal from logic 182 permits it to do so. The interrupt logic will also be excited by a vertical retrace signal generated by oscillator 152, and during the vertical retrace time it will flag the MCU 22 at a totally dead time. So the MCU 22 has plenty of time to modify the V1 and V2 control memories so that on a retrace time the whole picture could be changed. Thus, it could be pointing at one or two places during one frame and during the retrace time be switched over to a completely different set of locations in the memory. If such changes are made in small increments, the effect will be to create an illusion of a slow scanning across the memory, or the moving of a "porthole" across the memory. This is the scan mode.

Among the several features of the present invention is its ability to generate and simultaneously display on the CRT screen a background grid and a cursor. The background grid is comprised of two series of dots generated by a grid signal generator 198 and array so as to create the appearance on CRT 18 of major and minor grids, such grids being of lesser intensity than the video displayed but having a direct positional relationship thereto.

To produce the grid generator 198 developes a series of major grid-forming pulses and a series of minor grid-forming pulses, both of which are synchronized with oscillator 152, and both series of pulses are input to video mixer 150 to be mixed with data video and output to the CRT 18 for display.

Cursor control logic 200 responds to inputs from V1 and V2 control memories 172 and 174, oscillator 152 and V1-V2 read/write control 176 to develop pulses which when mixed with the data video in mixer 150 cause a particular configuration of cursor symbol to be developed on CRT 18. Since the cursor is likewise generated in synchronism with the video data output controls, its position will always precisely correspond to the displayed data.

The present invention makes it possible to provide several display features which have heretofore not been available in the prior art. Among these are the following:

BACKGROUND HASHING

The nature of the background of a video display is normally not a problem for direct view or random write devices. However, in the usual raster-type display, each horizontal trace will create a background line which can have a fatiguing effect on the eyes of one looking at the screen for long periods of time. As illustrated in FIG. 2c, this is caused by a uniform intensity of the display beam as it sweeps across the screen. It has been found in the present invention that by periodically blanking the display beam for a proportion of the normal data dot period, a hashing effect can be achieved which is much easier on the operator's eyes. This feature presents a more uniform background for white background/black data displays and also increases the boldness of lines drawn on the tube face. The hashing provides a more uniform appearance for both vertical and horizontal lines, since without it single width vertical lines are noticeably thinner than horizontal lines, the reason being that the spaces between horizontal scan lines are dark and as a result each horizontal line picks up additional width from both the preceding and following spaces; whereas vertical lines do not experience such widening. Instead of presently a background dot as white for the entire dot period and a data dot (a 1 in the RMEM) as black, all dots are presented for about 65% of the time period with the remaining 35% being black for all cases as shown in FIG. 2d. When a screen area has only background in it (the usual case), it appears as a matt surface. Without the present feature, the spaces between horizontal scan lines caused by line/line separation would be much more distracting.

DATA COMPLEMENTING (XORING)

Figures 7A, 7B:
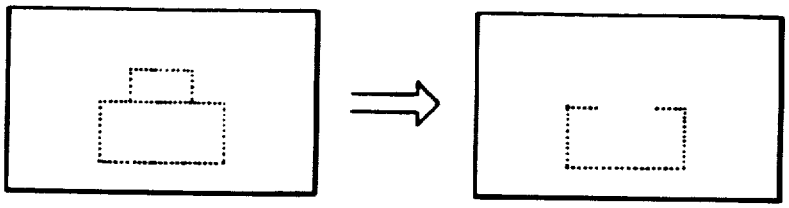

In prior art displays a picture has only a relatively short life before the host computer redraws it. Therefore, it is not necessary that any special treatment be given to overdrawn lines. However, in the present invention, because there is much less frequent need for redraw from the host computer, picture life is longer and picture integrity is much more important, it is necessary that when an overdrawn line is removed the original line reappear. In the present invention the writing of 1's to the RMEM (black dot) or 0's (erase a dot) allows a feature to be added or erased from the RMEM. A limitation exists, however, when one side of a figure overlies another as shown in FIG. 7a. Although the common side is written twice, its dots still have the value 1. However, as shown in FIG. 7b, when the small rectangle is erased, the common bits are all set to 0 leaving a gap in the side of the larger rectangle at the location previously shared by the small rectangle.

Now, since the present invention enables a newly drawn figure to be moved across the screen relative to previously drawn figures so that the operator can get it exactly lined up with the location he wants, this motion can be handled by repeated writing and erasing of the rectangle with each new copy following the motion of the operator's hand. Unfortunately, the erasing (as shown in FIG. 7b) would take bits of data out of the previously drawn picture possibly, making it unrecognizable.

Figures 8A, 8B:
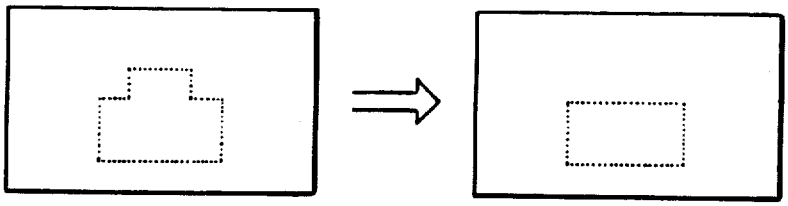

However, if instead of writing and erasing, the small rectangle is XORed (see FIG. 8a) into the picture and each bit in the RMEM to be occupied by the new data is modified based upon its previous "0" or "1" value, this will result in the blanking of overlying black lines as shown in FIG. 8a. But if the XOR is performed twice to remove the small rectangle, the original larger rectangle will be restored to its original shape as illustrated in FIG. 8b, those parts of the rectangle coinciding with other figures are written to background color by the first XOR and are returned to black by the second. This property of XOR is known mathematically as idempotency. However, if the small rectangle is blinked on and off, or is in continuous motion, its shape can be clearly seen even though parts of it may blink slightly out of phase with the rest of it. A further example of this feature is shown in FIG. 9 wherein a diagonal line 300 is shown intersecting a previously drawn rectangle 302. It will be noted that XORing of the intersections of the line and rectangle returns the intersection to the background level.

BACKGROUND GRID

As previously indicated, the video control unit 26 has the capability of generating pulses for mixing with the video to produce grid dots on the video screen. For purposes of illustration, a series of such dots are drawn in FIG. 9 to illustrate the effect such grid would have on the screen. To produce the minor grid, small dots are generated on every other scan line while major grid dots of a slightly higher intensity are generated on every tenth line to create a 5-to-1 major/minor grid. Although any grid spacing can be adopted, the chosen scale is for purposes of illustration. Note that the minor grid dots 304 are of a slightly darker intensity than the background (the background hashing not being illustrated in this figure), while the major grid dots 306 are of a slightly darker level than the minor dots 304.

The purpose of this grid is to simulate gridded paper to provide a drafting aid in the measuring and positioning of lines to be drawn on the screen. The grid is synchronized with the RMEM picture by the grid generator 198 (FIG. 6) but is not written into the RMEM. The grid only appears on the screen. No direct view display apparatus presently offers this feature because such a grid would have to be a part of the picture itself. Random writing refresh tubes usually cannot support the extra beam travel needed for such a feature because they are limited by beam travel, i.e., the additional time required to write the grid would slow down the picture refresh time and cause an undesirable flicker. No raster refresh display systems have yet incorporated the idea either. Scan conversion (indirect view storage tube) displays do not offer this feature, and if they tried to would face the difficulty of not being able to align the grid exactly with the memory because their memory is an analog storage tube.

PORTHOLING

The conventional graphics system can show any single frame of data that can be transmitted to the display device, but each change to another part of the data requires the host computer to erase and redraw the portion of the picture displayed. This can take several seconds or longer depending upon the load on the host computer. However, the present invention only has to receive a new pair of $X_0$, $Y_0$ coordinates from the host computer for the picture to be changed. The display then smoothly scans across the RMEM from a first location $X_0$, $Y_0$ to a second location $X_0'$, $Y_0'$ with no further host processor commands. The viewed area of the memory is changed only one or two dot distances per CRT frame (1/60th of a second=1 frame) giving the illusion of being in smooth continuous motion, thereby providing a window or "porthole" view of the RMEM. More particularly, the RMEM, which is an X-Y dot memory, is capable of being written on, erased, or XORed on a dot-by-dot basis to represent a stored picture, and the display screen is a TV-like monitor with electronics which operate in effect like an electronic "camera" that scans over the RMEM. A frame display is actually accomplished by a horizontal readout across an RMEM 28-memory line $Y_0$ followed by a dropping down to the next line, moving back to the starting horizontal position $X_0$ on flyback, and reading the next line.

In the present invention the porthole feature allows the display of only a fraction of the height and width of the entire RMEM storage area beginning at any selected $X_0$, $Y_0$. For example, if the rectangle 320 in FIG. 10a represents the entire RMEM storage area and the rectangle 322 represents a portion of the storage area to be displayed on screen 324, such area being identified by the corner coordinates $X_0$, $Y_0$, in order to scan the display to the adjacent position illustrated by the dashed lines 326, the only information required from the host computer is the new set of corner coordinates $X_0'$, $Y_0'$. The illustrated $N \times M$ array is not intended to imply that the actual physical layout of storage sites is in the form of a rectangular matrix, but only that this is the manner in which the data is intended to be addressed, read out and displayed.

This feature was probably not considered in prior art raster displays because the typical raster memory used a magnetic disk or serial shift register to store the data. With such devices, the implementation of such a scheme would be very difficult because of the timing considerations, i.e., the time required for flyback at the end of each scan line, is less than 20 microseconds. Portholing is likewise not possible on direct view storage tubes or plasma panels because in such displays the RMEM and screen are by definition one and the same.

DISPLAY ZOOM

In previous raster displays with magnetic disk or serial memory, a zoom feature would be very difficult to achieve for the same reasons that portholing is difficult, i.e., that such memories are usually locked in a synchronous rotational period and cannot be speeded up or slowed down. As indicated previously, direct view displays have RMEM and display screens which are one and the same device. So by definition, zoom is not possible. However, in the present invention circuitry is provided which enables the scan of only, for example, half as many lines and half as many dots as are required in the display distance to create a picture twice as large, i.e., a zoom of 2-to-1. This enables a picture to be drawn on the display screen which is much easier to work with because all distances are exaggerated by a factor of two. The slower rate of scanning is achieved by changing the time for each data bit to be read out of the RMEM, or by repeating the readout of each dot two or more times, and by repeating each scan line two or more times before moving to the next. In accordance with the present invention any desired zoom could be accommodated. For example, in the preferred embodiment, zooms of one and a half, two, three, and four-to-one have been selected.

Reference is again made in FIG. 10a wherein the storage area designated 322 may be displayed on a 1-to-1 basis on CRT 18 as illustrated at 324, or the smaller storage area 328 could be magnified 4 times and displayed on CRT 18 as illustrated. Obviously, any other desired zoom factor could also be accommodated.

SPLIT SCREEN

In many applications it is desirable to simultaneously display data from different locations of the RMEM, or to display portions of the same location at different magnifications so as to facilitate the operation at hand. The present invention permits such simultaneous display by using a split screen feature wherein one portion of RMEM 28 can be displayed, either magnified or unmagnified, on a portion of the CRT 18, and another region or area of RMEM 28 can be displayed on the remaining area of CRT 18.

For example, in FIG. 10a, a display on screen 324 of the RMEM area designated by block 322 may be accomplished at a 1x magnification while a small corner portion 330 of screen 324 may be reserved to show a close-up at a 2x zoom of the small area of RMEM 28 indicated by the block 328. In utilizing this type of display, the operator may desire to selectively scan one of the displayed areas for any of a variety of reasons. It is important to note that the scanning of one of the areas of data has no effect whatsoever on the other area being displayed. Cursors (shown as asterisks) in the 1x area 324 and in the 2x area 330 are positioned in the drawing to match the location of a single imaginary cursor location 332 in RMEM 28. The cursors allow the operator to point to data in the drawing and help the operator to maintain his orientation relative to the drawing. The application of a split such as shown in FIG. 10a is extremely useful in working with the fine detail while maintaining orientation in the larger area 322.

The pan and split screen features of the invention also permit the RMEM 28 to be treated as if it contained several completely independent data pictures and each screen split as if it were a separate camera focused on the respective data pictures. For example, as shown in FIG. 10b, RMEM 28 can be divided into four areas: (1) a 1x picture copy 360, (2) a separately drawn ½x picture copy 361; (3) an alphanumeric area 363 for short MCU messages, or short computer messages to the operator; and (4) a full alphanumeric page 362 containing long messages to be displayed without erasing the graphic picture copies. Screen 368 is made up of three splits simultaneously showing most of the ½x copy 361 at 365, a small close-up at 364 from the 1x copy segment 367, and a strip of the alphanumeric messages 363 along the bottom of the screen at 366.

The MCU 22 has the necessary speed and capability of dealing with the complex "camera work" required to implement a display such as shown in FIG. 10b, and such layout is in fact utilized in the preferred embodiment of the present invention. However, complexities arise for instance when panning the "camera" near the top edge of the 1x copy 360 and to deal with this problem, the MCU is programmed so that the alphanumeric message area 363 will always be kept "off camera," since a panning across the graphic 1x copy onto the message area would be very disconcerting to the operator who sees the same message at the screen bottom 366.

Although in the preferred embodiment the panning operation is implemented through the use of a sequence of micro codes containing in the CPU memory 84 (FIG. 4) and executed by the CPU 76, a hardwired circuit using adders, registers, comparators, etc., such as shown in FIG. 11, could alternatively be used. In the following discussion FIG. 10b is also referred to as an illustration of one possible panning operation.

Data originates on EXT CPU data bus 32 from a control source such as the host 10 and is loaded into $X_{0'}$, $Y_{0'}$ holding register 400. A delta size register 402, which controls the speed of movement, is also loaded from the data bus 32. A split select register 404, also loaded from the data bus, addresses the screen size memory 414 RMEM boundary memory 416 and outside edge memory 418. The logic is activated once per display frame by the split interrupt logic 182 (FIG. 6). When notified, the current location $X_0$, $Y_0$ is sent to the V1 memory 172 or the V2 memory 174 (FIG. 6), depending on the split in use, over bus 32. At the same time $X_0$, $Y_0$ is sent to the delta move comparator 408 where a dicision is made based on the values of $X_0$, $Y_0$, $X_0'$, $Y_0'$ and the delta size. Essentially, the decision is (1) if $X_0'$, $Y_0'$ is outside the boundary of the RMEM area 360 (FIG. 10b) selected by split select 404, no move is generated, (2), if $X_0'$, $Y_0' = X_0$, $Y_0$ no move is generated (3) otherwise a move of delta size 402 is made in the + or − directions to bring $X_0$, $Y_0$ closer to $X_0'$, $Y_0'$. Delta size is usually one RMEM unit.

The adder 410 sums $X_0$, $Y_0$ from 406 with the signed delta developed by the delta move comparator 408. The result is adjusted by the boundary comparator and adjuster 412. This adjustment is based on the size of the screen 364 as supplied by the screen size memory 414, the boundary RMEM area 360 supplied by the RMEM boundary memory 416 and edge information from the outside edge memory 418. Essentially, the rectangle 367, which is the size required by screen area 364, may be moved to a new $X_0'$, $Y_0'$ but the entire rectangle must stay within the boundaries of the RMEM sub-area 360. If any $X_0$, $Y_0$ is received from the adder 410 that allows any side of the rectangle 367 to overlap any boundary of RMEM area 360, the boundary adjuster 412 corrects $X_0$, $Y_0$ to the nearest value allowing 367 to be entirely inside 360. The outside edge memory notifies the boundary adjuster 412 of "outside edges" 370 of the RMEM area 360.

The "camera" is allowed to pan an additional ½ width (a height of 367) past an outside edge, since the undefined memory past the outside edge is always the background color. The area 360 has right, left, and bottom edges as outside edges. The area 361, however, has only left and top edges as its outside edges. The adjusted new $X_0$, $Y_0$ is deposited back in the current $X_0$, $Y_0$ location 406 and will be sent to V1/V2 on the next frame interrupt from 182. Thus, each display frame shows the next advanced image, and the picture moves smoothly from $X_0$, $Y_0$ to $X_0'$, $Y_0'$.

It should also be recognized that many other partitions of the RMEM 28 are possible and that the partitioning allows (1) the host computer to draw any combination of zooms into the RMEM, thus permitting greater ranges of zoom than the hardware permits, e.g., the arrangement of FIG. 10b allows a zoom of from ½x up to 4x, equivalent to 1x to 8x (whereas the hardware zoom goes only from 1x to 4x), (2) the use of many combinations of alphanumerics (messages, prompts, XY displays, status displays, (etc.) with grahics, and (3) the use of many animation techniques, such as partitioning the RMEM into several (perhaps a dozen or more) areas and the drawing of a separate still from a moving picture cartoon in each area, then moving under MCU control from area to area rapidly enough to give the illusion of motion. Such moving picture studies might be helpful in the analysis of mechanical linkages, for medical studies of patient walking gaits, etc. Lengthy movies can also be made provided new frames of data can be erased and redrawn by the host computer 10 as fast as they are used.

The disclosure up to this point has been limited to a discussion of the invention as embodied in a black/-white display system with the RMEM 28 having only one bit provided at a particular X-Y memory location to specify white (0) or black (1) data. However, as illustrated in part in FIG. 12 the invention can also be implemented in an embodiment which provides a color display of $2^N$ colors by assigning N bits to the RMEM X-Y bit locations. For example, as schematically shown in FIG. 12, two identical memory boards 500 and 502 could be utilized in the RMEM with the corresponding bit locations containing binary data which can be simultaneously read out through a dual FIFO 504, converted to serial form by dual parallel-to-serial converters 506 and then decoded by a binary decoder 508.

The decoded information will then be used to output color signals from $2^N$ (i.e., 4 in the illustration) hue memory units 410 whose color levels are selected by the MCU, such outputs being fed to an appropriate color video mixer 512 for use in driving a suitable multi-color display unit. For example, in a single display, one set of colors could be selected by the MCU for use in one split and other sets of colors could be selected by the MCU for the other splits. The change at each split is synchronized by signals from the interrupt logic 182. For instance, if red, green, blue and white (background) were to be selected for the graphics part of the display (364 and 365 in FIG. 10b), then any other set of four colors, including different background shades, could be used to highlight the alphanumeric messages 366. Additionally, as different alphanumeric messages occur, the MCU can specify still other colors and backgrounds to distinguish emergency or high priority messages. Incidentally, this last technique would be effective even in the previously described one-bit RMEM embodiment of the invention.

One of the major differences in this embodiment as compared to the previously described embodiment would be that the FIFO word length would be increased from 16 bits to 32 bits and the RMEM bit modify logic would be increased from 1 bit to 2 bits.

EXAMPLE:

N=2

Colors=A,B,C,D,X-Y bit assignments (first bit=-board 500, second bit=board 502)

Color A=00 (e.g., white-background)

Color B=01 (e.g., red)

Color C=10 (e.g., green)

Color D=11 (e.g., blue)

The following table demonstrates the idempotency (apply XOR twice and return to original color) of ⊕ (XOR) under the selected color codes:

TABLE 4

| | |
|---|---|
| A ⊕ B = B | B ⊕ B = A |
| A ⊕ C = C | C ⊕ C = A |
| A ⊕ D = D | D ⊕ D = A |
| B ⊕ C = D | D ⊕ B = B |
| B ⊕ D = C | C ⊕ B = B |
| C ⊕ D = B | B ⊕ C = C |

Alternatively, the present invention could be implemented with any serial data storage device, the only limitation being that for every multiple of a line time that cannot be randomly accessed, a RAM line storage equal to that multiple will be required for Y splits. For example, if the worst case latency of any bit in the serial memory is 200 μsec, then since a line time is approximately equal to 50 μsec, a 4-line RAM storage cell will be needed to permit a Y split. If an X split is to be accomplished as well, two 4-line RAM storage cells will be required.

Whereas the present invention has been defined in terms of a simplified illustrative example utilizing a somewhat generalized block diagram presentation, it is contemplated that alterations and modifications of the system as well as the various interrelationships of the illustrated components will become apparent to those skilled in the art after having read the foregoing disclosure. Accordingly, it is to be understood that the particular apparatus described is for purposes of illustration only and the appended claims are to be interpreted as covering all modifications and alterations that fall within the true spirit and scope of the invention. What is claimed is:

[1. A computer graphics display system for use in association with a host computer to provide a visual display of graphics information contained therein, comprising:

a data bus;

an address bus;

display means for developing a visible image corresponding to video signals input thereto;

channel adapter means for providing an interface for communicating information including bits of graphics data between the host computer and said data bus and said address bus;

system control means communicatively coupled to said data bus and said address bus and operative to generate first and second control signals;

raster memory means including an array of N rows and M columns of storage sites each capable of storing a bit of graphics data corresponding to a picture element of a graphics image to be formed by said display means;

raster memory control means communicatively coupled to said address bus, said data bus, said raster memory means and said system control means, said raster memory control means being responsive to said first control signal and operative to cause bits of graphics data input from the host computer to be stored in said raster memory means; and video control means communicatively coupled to said address bus, said data bus, said raster memory means, said display means, and said system control means, said video control means being responsive to said second control signal and operative to read out in raster fashion data stored in any selected block of n rows and m columns of said storage sites, where n is an integer less than N and m is an integer less than M, and to use such data to generate a video signal for input to said display means whereby said display means is caused to display an image comprised of picture elements corresponding to the data obtained in the selected block of storage sites.]

2. A computer graphics display system [as recited in claim 1 wherein said video control means includes,] *for use in association with a host computer to provide a visual display of graphics information contained therein, comprising:*

*a data bus;*

*an address bus;*

*display means for developing a visible image corresponding to video signals input thereto;*

*channel adapter means for providing an interface for communicating information including bits of graphics data between the host computer and said data bus and said address bus;*

*system control means communicatively coupled to said data bus and said address bus and operative to generate first and second control signals;*

*raster memory means including an array of N rows and M columns of storage sites each capable of storing a bit of graphics data corresponding to a picture element of a graphics image to be formed by said display means;*

*raster memory control means communicatively coupled to said address bus, said data bus, said raster memory means and said system control means, said raster memory control means being responsive to said first control signal and operative to cause bits of graphics data input from the host computer to be stored in said raster memory means;*

*video control means communicatively coupled to said address bus, said data bus, said raster memory means, said display means, and said system control means, said video control means being responsive to said sec-*

*ond control signal and operative to read out in raster fashion data stored in any selected block of n rows and m columns of said storage sites, where n is an integer less than N and m is an integer less than M, and to use such data to generate a video signal for input to said display means whereby said display means is caused to display an image comprised of picture elements corresponding to the data obtained in the selected block of storage sites; said video memory control means including:* a first control memory for storing a first set of readout control instructions received from said system control means;

a second control memory for storing a second set of readout control instructions received from said system control means;

readout means for reading out bits of graphics data stored in said raster memory means; and logic means for causing said readout means to read out data stored in a first selected block of storage sites of said raster memory means under control of said first set of instructions and to read out data stored in a second selected block of storage sites of said raster memory means under control of said second set of instructions, the data read out of said first and second blocks of storage sites being included in said video signal and said display means being caused to simultaneously display a first image corresponding to the data from said first block and a second image corresponding to the data from said second block.

3. A computer graphics display system as recited in claim 2 wherein said video control means further includes, cursor control logic for generating a cursor signal; and video mixer means for mixing said cursor signal and the data from said first and second blocks to develop said video signal.

[4. A computer graphics display system as recited in claim 1 wherein said video control means includes zoom control logic for controlling the number of times each bit of data is to be consecutively read out of said raster memory means by said readout means whereby data read out a first number of times will be displayed at a first scale and data read out a second number of times will be displayed at a second scale different from said first scale.]

5. A computer graphics display system [as recited in claim 1 wherein said video control means includes,] *for use in association with a host computer to provide a visual display of graphics information contained therein, comprising:*

*a data bus;*

*an address bus;*

*display means for developing a visible image corresponding to video signals input thereto;*

*channel adapter means for providing an interface for communicating information including bits of graphics data between the host computer and said data bus and said address bus;*

*system control means communicatively coupled to said data bus and said address bus and operative to generate first and second control signals;*

*raster memory means including an array of N rows and M columns of storage sites each capable of storing a bit of graphics data corresponding to a picture element of a graphics image to be formed by said display means;*

*raster memory control means communicatively coupled to said address bus, said data bus, said raster memory means and said system control means, said raster memory control means being responsive to said first control signal and operative to cause bits of graphics data input from the host computer to be stored in said raster memory means;*

*video control means communicatively coupled to said address bus, said data bus, said raster memory means, said display means, and said system control means, said video control means being responsive to said second control signal and operative to read out in raster fashion data stored in any selected block of n rows and m columns of said storage sites, where n is an integer less than N and m is an integer less than M, and to use such data to generate a video signal for input to said display means whereby said display means is caused to display an image comprised of picture elements corresponding to the data obtained in the selected block of storage sites; said video control means including:* grid generator means for generating grid signals for display by said display means; and video mixer means for mixing said grid signals with the data read out of said selected block to develop said video signal whereby the displayed image includes a background grid having a predetermined positional relationship to the displayed graphics data.

6. A computer graphics display system [as recited in claim 1 wherein said video control means includes,] *for use in association with a host computer to provide a visual display of graphics information contained therein, comprising:*

*a data bus;*

*an address bus;*

*display means for developing a visible image corresponding to video signals input thereto;*

*channel adapter means for providing an interface for communicating information including bits of graphics data between the host computer and said data bus and said address bus;*

*system control means communicatively coupled to said data bus and said address bus and operative to generate first and second control signals;*

*raster memory means including an array of N rows and M columns of storage sites each capable of storing a bit of graphics data corresponding to a picture element of a graphics image to be formed by said display means;*

*raster memory control means communicatively coupled to said address bus, said data bus, said raster memory means and said system control means, said raster memory control means being responsive to said first control signal and operative to cause bits of graphics data input from the host computer to be stored in said raster memory means;*

*video control means communicatively coupled to said address bus, said data bus, said raster memory means, said display means, and said system control means, said video control means being responsive to said second control signal and operative to read out in raster fashion data stored in any selected block of n rows and m columns of said storage sites, where n is an integer less than N and m is an integer less than M, and to use such data to generate a video signal for input to*

*said display means whereby said display means is caused to display an image comprised of picture elements corresponding to the data obtained in the selected block of storage sites; said video control means including:* logic means for enabling the boundaries of said block of storage sites to be incrementally changed so as to cause the corresponding display to appear to pan across the raster memory means.

7. A computer graphics display system as recited in claim 6 wherein said system control means includes means for limiting the area of said raster memory means over which said boundaries may be incrementally changed.

8. A computer graphics display system as recited in claim 2 wherein said logic means includes; *first* means for determining when all data from said first block has been read out, [and] *second means, cooperating with said first means,* for causing said system control means to load a third set of read out control instructions into said first control memory, *said logic means causing said readout means to read out data stored in a third selected block of storage sites of said raster memory means under control of said third set of instructions,* and [for determining] *third means, operative* when all data from [a] *said* third block of storage sites has been read out, [and] for causing said system control means to reload said first set of control instructions back into said first control memory, *said logic means* thus causing said display means to simultaneously display first, second and third images corresponding to the first, second and third blocks of data.

9. A computer graphics display system [as recited in claim 1 wherein said raster memory control means includes] *for use in association with a host computer to provide a visual display of graphics information contained therein, comprising:*

*a data bus;*

*an address bus;*

*display means for developing a visible image corresponding to video signals input thereto;*

*channel adapter means for providing an interface for communicating information including bits of graphics data between the host computer and said data bus and said address bus;*

*system control means communicatively coupled to said data bus and said address bus and operative to generate first and second control signals;*

*raster memory means including an array of N rows and M columns of storage sites each capable of storing a bit of graphics data corresponding to a picture element of a graphics image to be formed by said display means;*

*raster memory control means communicatively coupled to said address bus, said data bus, said raster memory means and said system control means, said raster memory control means being responsive to said first control signal and operative to cause bits of graphics data input from the host computer to be stored in said raster memory means;*

*video control means communicatively coupled to said address bus, said data bus, said raster memory means, said display means, and said system control means, said video control means being responsive to said second control signal and operative to read out in raster fashion data stored in any selected block of n rows and m columns of said storage sites, where n is an integer less than N and m is an integer less than M, and to use such data to generate a video signal for input to said display means whereby said display means is caused to display an image comprised of picture elements corresponding to the data obtained in the selected block of storage sites; said raster memory control means including:* means for inputting data into selected ones of said storage sites and for causing such data input to sites presently occupied by other data to be logically exclusive ORed.

[10. A computer graphics display system as recited in claim 1 wherein said display means is capable of developing a multicolored image and said raster memory means further includes another array of N rows and M columns of storage sites each directly corresponding to a storage site of said first mentioned array, corresponding memory sites of the respective arrays being adapted to receive data which jointly constitute a binary code identifying the color of an image component corresponding thereto;

and wherein said video control means includes means for simultaneously reading out data from corresponding storage sites of said arrays to develop a series of binary signals;

decoding means for decoding said binary signals and developing a plurality of decoded signals corresponding thereto;

hue memory means responsive to said decoded signals and operative to develop a plurality of corresponding color component signals; and video mixing means for combining said color component signals to develop a color video signal for driving said display means.]

11. A computer graphics display system as recited in claim 8 wherein said raster memory control means includes means for causing data selectively input to said raster memory means at sites presently occupied by other data to be logically exclusive ORed.

[12. A computer graphics display system as recited in claim 1 wherein said raster memory control means includes zig-zag control logic for causing a block of data to be read into said raster memory means in a predetermined zig-zag pattern defined by a single set of coordinate points identifying one corner of the block of data.]

13. A computer graphics display system [as recited in claim 1 wherein said raster memory control means includes] *for use in association with a host computer to provide a visual display of graphics information contained therein, comprising:*

*a data bus;*

*an address bus;*

*display means for developing a visible image corresponding to video signals input thereto;*

*channel adapter means for providing an interface for communicating information including bits of graphics data between the host computer and said data bus and said address bus;*

*system control means communicatively coupled to said data bus and said address bus and operative to generate first and second control signals;*

*raster memory means including an array of N rows and M columns of storage sites each capable of storing a bit of graphics data corresponding to a picture element of a graphics image to be formed by said display means;*

*raster memory control means communicatively coupled to said address bus, said data bus, said raster memory*

*means and said system control means, said raster memory control means being responsive to said first control signal and operative to cause bits of graphics data input from the host computer to be stored in said raster memory means;*

*video control means communicatively coupled to said address bus, said data bus, said raster memory means, said display means, and said system control means, said video control means being responsive to said second control signal and operative to read out in raster fashion data stored in any selected block of n rows and m columns of said storage sites, where n is an integer less than N and m is an integer less than M, and to use such data to generate a video signal for input to said display means whereby said display means is caused to display an image comprised of picture elements corresponding to the data obtained in the selected block of storage sites; said raster memory control means including:* skip pattern control means for periodically inhibiting a storage operation in a predetermined manner so as to prevent certain bits of the graphics data appearing on said data bus from being stored in said raster memory means.

14. A computer graphics display system as recited in claim 13 wherein said skip pattern control means includes a skip pattern memory for storing a plurality of predetermined skip pattern commands, and logic means controlled by said system control means and operative to select one of said skip pattern commands and to generate a first signal in accordance therewith for periodically inhibiting said storage operation.

15. A computer graphics display system as recited in claim 14 wherein said skip pattern control means further includes modulo arithmetic logic means for generating a second signal for perodically inhibiting said storage operation.

16. A computer graphics display system [as recited in claim 1 wherein said video control means includes] *for use in association with a host computer to provide a visual display of graphics information contained therein, comprising:*

*a data bus;*

*an address bus;*

*display means for developing a visible image corresponding to video signals input thereto;*

*channel adapter means for providing an interface for communicating information including bits of graphics data between the host computer and said data bus and said address bus;*

*system control means communicatively coupled to said data bus and said address bus and operative to generate first and second control signals;*

*raster memory means including an array of N rows and M columns of storage sites each capable of storing a bit of graphics data corresponding to a picture element of a graphics image to be formed by said display means;*

*raster memory control means communicatively coupled to said address bus, said data bus, said raster memory means and said system control means, said raster memory control means being responsive to said first control signal and operative to cause bits of graphics data input from the host computer to be stored in said raster memory means;*

*video control means communicatively coupled to said address bus, said data bus, said raster memory means, said display means, and said system control means, said video control means being responsive to said second control signal and operative to read out in raster fashion datastored in any selected block of n rows and m columns of said storage sites, where n is an integer less than N and m is an integer less than M, and to use such data to generate a video signal for input to said display means whereby said display means is caused to display an image comprised of picture elements corresponding to the data obtained in the selected block of storage sites; said video control means including:* sync generator means for generating a hashing pulse train and [a dot clock generator] *hashing logic means* responsive to said hashing pulse train [and operative to cause] *for causing* said video signal to be pulsed on and off to cause the display to appear to have a matt background.

17. A computer graphics display system comprising:

video signal generating means for developing a raster signal including a plurality of scan lines each divided into a plurality of equal signal periods containing information corresponding to picture elements of an image to be displayed;

hashing means for periodically disabling the output of said generating means so as to blank said raster signal during a predetermined portion of each said signal period; and video display means responsive in the periodically blanked raster signal and operative to develop a visual image corresponding thereto such that the said blanking of said raster signal causes the displayed image to appear to have a matt background.

[18. A computer graphics system for displaying in raster fashion an image comprised of an n×m array of picture elements, comprising:

raster memory means including a data storage array having N rows and M columns of data storage sites;

means for providing a selectable first origin address signal for designating the origin site of a first n×m array of storage sites in said raster memory means, where n is an integer less than N and m is an integer less than M;

clock generating means for generating first, second and third clock signals, said first clock signal including Zm signal pulses for each signal pulse of said second clock signal, and said second clock signal including Zn signal pulses for each signal pulse of said third clock signal, where Z is any positive integer;

means responsive to said first origin address signal and said first second and third clock signals and operative to start at the origin site of said first n×m array and read out data from m storage sites in each of the n rows of said first n×m array;

raster means for developing a raster scan signal from the data read out of said first n×m array; and display means responsive to said raster scan signal and operative to display an image corresponding to the data contained in said first n×m array.]

[19. A computer graphics system as recited in claim 18 and further comprising:

means for providing a second origin address signal for designating the origin site of a second n×m array of storage sites in said raster memory means;

means responsive to said second origin address signal and said first, second and third clock signals and operative to start at the origin site of said second n×m array and read out data from m storage sites in each of the n rows of said second n×m array; and wherein said raster means also develops another raster scan signal from the data read out of said second n×m array and said display means also responds to said other raster scan signal to display the data contained in said second n×m array.]

20. A computer graphics display system [as recited in claim 19] *for displaying in raster fashion an image comprised of an n×m array of picture elements, comprising:*

*raster memory means including a data storage array having N rows and M columns of data storage sites;*

*means for providing a selectable first origin address signal for designating the origin site of a first n×m array of storage sites in said raster memory means, where n is an integer less than N and m is an integer less than M;*

*clock generating means for generating first, second and third clock signals, said first clock signal including Zm signal pulses for each signal pulse of said second clock signal, and said second clock signal including Zn signal pulses for each signal pulse of said third clock signal, where Z is any positive integer;*

*means responsive to said first origin address signal and said first, second and third clock signals and operative to start at the origin site of said first n×m array and read out data from m storage sites in each of the n rows of said first n×m array;*

*raster means for developing a raster scan signal from the data read out of said first n×m array;*

*display means responsive to said raster scan signal and operative to display an image corresponding to the data contained in said first n×m array;*

*means for providing a second origin address signal for designating the origin site of a second n×m array of storage sites in said raster memory means;*

*means responsive to said second origin address signal and said first, second and third clock signals and operative to start at the origin site of said second n×m array and read out data from m storage sites in each of the n rows of said second n×m array;*

*wherein said raster means also develops another raster scan signal from the data read out of said second n×m array and said display means also responds to said other raster scan signal to display the data contained in said second n×m array; and* wherein the data in said second n×m array is read out and displayed at a time subsequent to the reading out and display of the data in said first n×m array and means are provided for synchronizing the change in display with said third clock signal so that no displayed image includes data from both said first n×m array and said second n×m array.

21. A computer grahics display system as recited in claim 20 and further comprising:

means for providing a series of other origin address signals identifying other n×m arrays of storage sites located between said first and second n×m arrays;

means responsive to each of said origin address signals and said first, second and third clock signals and operative to sequentially start at the origin site of each of said series of address signals and read out data from m storage sides in each of the n rows of each such array; and means for generating a pan clock signal that is a multiple of said third clock signal for synchronizing the change in read out from one n×m array to the other so as to create in the resulting display an illusion of smooth panning from said first n×m array through said other n×m arrays to said second n×m array.

22. A computer graphics display system as recited in claim *20 or* 21 wherein each of the said n×m arrays respectively contains data relating to phased still graphics of a cartoon to be animated, and said system further includes means for cyclically reading out in a predetermined series the data from said arrays so as to create in the display an illusion of animated cartoon motion.

23. A computer graphics display system as recited in claim *20 or* 21 wherein each of the said n×m arrays respectively contains data at variance with the data of the other arrays, and said system further includes means for cyclically reading out in a predetermined series the data from said arrays so as to create the illusion of a continuously varying image.

[24. A computer graphics system for displaying in an n×m array of picture elements a magnified image of data contained in a zoomed portion of an N×M memory array, comprising:

raster memory means including a data storage array having N rows and M columns of data storage sites;

means for providing an origin address signal for designating the origin site of an n/Z×m/Z Array of storage sites in said raster memory means where Z is an integer, n/Z is an integer equal to or less than N, and m/Z is an integer equal to or less than M;

clock generating means for generating first, second and third clock signals, said first clock signal including m signal pulses for each signal pulse of said second clock signal, and said second clock signal including n signal pulses for each signal pulse of said third clock signal;

means for generating a zoom signal having a zoom factor of Z;

means responsive to said origin address signal, said first, second and third clock signals, and said zoom signal and operative to start at the origin site of said n/Z×m/Z array and read out data from m/Z storage sites in each row thereof, the data contained in each site in each row being read out Z consecutive times before the data contained in the next adjacent site is read out, and the data read out of each row being repeated Z consecutive times before data is read out from the next row;

raster means for developing a raster scan signal from the data read out; and display means responsive to said raster scan signal and operative to display an image corresponding to the data contained in said n/Z×m/Z array.]

25. A computer grahics display system [as recited in claim 24] *for displaying in an n×m array of picture elements a magnified image of data contained in a zoomed portion of an N×M memory array, comprising:*

*raster memory means including a data storage array having N rows and M columns of data storage sites;*

*means for providing an origin address signal for designating the origin site of an n/Z×m/Z array of storage sites in said raster memory means where Z is an integer, n/Z is an integer equal to or less than N, and m/Z is an integer equal to or less than M;*

*clock generating means for generating first, second and third clock signals, said first clock signal including m signal pulses for each signal pulse of said second clock signal, and said second clock signal including n signal pulses for each signal pulse of said third clock signal;*

*means for generating a zoom signal having a zoom factor of Z;*

*means responsive to said origin address signal, said first, second and third clock signals, and said zoom signal and operative to start at the origin site of said $n/Z \times m/Z$ array and read out data from m/Z storage sites in each row thereof, the data contained in each site in each row being read out Z consecutive times before the data contained in the next adjacent site is read out, and the data read out of each row being repeated Z consecutive times before data is read out from the next row;*

*raster means for developing a raster scan signal from the data read out;*

*display means responsive to said raster scan signal and operative to display an image corresponding to the data contained in said $n/Z \times m/Z$ array; and* wherein said means for providing an origin address signal is synchronized with said third clock signal and is capable of sequentially providing other origin address signals in synchronism with said third clock signal so as to cause the display made by said display means to create the illusion of a panning of said data storage array.

26. A computer graphics display system comprising:

raster memory means including a data storage array having N rows and M columns of data storage sites;

first means for providing a first origin address signal for designating the origin site of a first $r \times m$ array of storage sites in said raster memory means;

second means for providing a second origin address signal for designating the origin site of a second $s \times m$ array of storage sites in said raster memory means, where n is an integer equal to or less than N, m is an integer equal to or less than M, and r and s are integers selected to satisfy the equation $r \times s = n$;

clock generating means for generating first, second and third raster clock signals, said first raster clock signal including m signal pulses for each signal pulse of said second raster clock signal, and said second clock signal including n signal pulses for each signal pulse of said third clock signal;

means responsive to said first origin address signal, said second origin address signal and said first, second and third raster clock signals and operative to start at the origin site of said first array and to read out data from m storage sites in each of the r rows thereof and then start at the origin site of said second array and read out data from m storage sites in each of the s rows thereof;

raster means for developing a raster scan signal from the data read out from said first and second arrays; and display means responsive to said raster scan signal and operative to display a split image containing the data from both said first array and said second array.

27. A computer graphics display system comprising:

raster memory means including a data storage array having N rows and M columns of data storage sites;

first means for providing a first origin address signal for designating the origin site of a first $n \times u$ array of storage sites in said raster memory means;

second means for providing a second origin address signal for designating the origin site of a second $n \times v$ array of storage sites in said raster memory means, where n is an integer equal to or less than N, m is an integer equal to or less than M, and u and v are integers selected to satisfy the equation $u + v = m$;

clock generating means for generating first, second and third raster clock signals, said first raster clock signal including m signal pulses for each signal pulse of said second raster clock signal, and said second clock signal including n signal pulses for each signal pulse of said third clock signal;

means responsive to said first origin address signal, said second origin address signal and said first, second and third raster clock signals and operative to start at the origin site of said first array and read out data from u storage sites in the first row of said first array and then read out data from v storage sites in the first row of said second array followed by a series of similar split readouts of data from the next $n-1$ rows of said first and second arrays;

raster means for developing a raster scan signal from the data read out from said first and second arrays; and display means responsive to said raster scan signal and operative to display a split image containing the data from both said first array and said second array.

28. A computer graphics display system [as recited in claim 18 and further comprising:] *for displaying in raster fashion an image comprised of an $n \times m$ array of picture elements, comprising:*

*raster memory means including a data storage array having N rows and M columns of data storage sites;*

*means for providing a selectable first origin address signal for designating the origin site of a first $n \times m$ array or storage sites in said raster memory means, where n is an integer less than N and m is an integer less than M;*

*clock generating means for generating first, second and third clock signals, said first clock signal including Zm signal pulses for each signal pulse of said second clock signal, and said second clock signal including Zn signal pulses for each signal pulse of said third clock signal, where Z is any positive integer;*

*means responsive to said first origin address signal and said first, second and third clock signals and operative to start at the origin site of said first $n \times m$ array and read out data from m storage sites in each of the n rows of said first $n \times m$ array;*

*raster means for developing a raster scan signal from the data read out of said first $n \times m$ array;*

*display means responsive to said raster scan signal and operative to display an image corresponding to the data contained in said first $n \times m$ array;* means for generating a grid signal including a series of pulses occurring in a series of regular timed intervals; and means for synchronously mixing said grid signals with the data read out of said $n \times m$ array so that the displayed image includes a background grid which has a predetermined positional relationship to the data contained in said data storage array.

29. A computer graphics display system [as recited in claim 24 and further including] *for displaying in an $n \times m$ array of picture elements a magnified image of data contained in a zoomed portion of an $N \times M$ memory array, comprising;*

*raster memory means including a data storage array having N rows and M columns of data storage sites;*

*means for providing an origin address signal for designating the origin site of an $n/Z \times m/Z$ array of storage sites in said raster memory means where Z is an integer, $n/Z$ is an integer equal to or less than N, and $m/Z$ is an integer equal to or less than M;*

*clock generating means for generating first, second and third clock signals, said first clock signal including m signal pulses for each signal pulse of said second clock signal, and said second clock signal including n signal pulses for each signal pulse of said third clock signal;*

*means for generating a zoom signal having a zoom factor of Z;*

*means responsive to said origin address signal, said first, second and third clock signals, and said zoom signal and operative to start at the origin site of said $n/Z \times m/Z$ array and read out data from $m/Z$ storage sites in each row thereof, the data contained in each site in each row being read out Z consecutive times before the data contained in the next adjacent site is read out, and the data read out of each row being repeated Z consecutive times before data is read out from the next row;*

*raster means for developing a raster scan signal from the data read out;*

*display means responsive to said raster scan signal and operative to display an image corresponding to the data contained in said $n/Z \times m/Z$ array; and* means for selectively inhibiting the readout of data from each storage site for one or more of the Z consecutive readout operations, and for inhibiting the corresponding repeat readout of each row of data whereby a zoomed display of a plurality of adjacent storage sites containing data will be displayed as an array of spaced apart dots rather than as a solid area so as to provide a visually perceptible separation of adjacent bits of data.

30. A computer graphics display system for use in association with a host computer to provide a visual display of graphics information contained therein, comprising:

a data bus;

an address bus;

display means for developing a visible image corresponding to video signals input thereto;

channel adapter means for providing an interface for communicating information including bits of graphics data between the host computer and said data bus and said address bus;

system control means communicatively coupled to said data bus and said address bus and operative to generate first and second control signals;

raster memory means including an array of N rows and M columns of storage sites each capable of storing a bit of graphics data corresponding to a picture element of a graphics image to be formed by said display means;

raster memory control means communicatively coupled to said address bus, said data bus, said raster memory means and said system control means, said raster memory control means being responsive to said first control signal and operative to cause bits of graphics data input from the host computer to be stored in said raster memory means, said raster memory control means including means for inputting data into selected ones of said storage sites and for causing such data input to sites presently occupied by other data to be logically exclusive ORed; and video control means communicatively coupled to said address bus, said data bus, said raster memory means, said display means, and said system control means, said video control means being responsive to said second control signal and operative to read out in raster fashion data stored in said raster memory means and to use such data to generate a video signal for input to said display means.

31. A computer graphics display system for use in association with a host computer to provide a visual display of graphics information contained therein, comprising:

a data bus;

an address bus;

display means for developing a visible image corresponding to video signals input thereto;

channel adapter means for providing an interface for communicating information including bits of graphics data between the host computer and said data bus and said address bus;

system control means communicatively coupled to said data bus and said address bus and operative to generate first and second control signals;

raster memory means including an array of N rows and M columns of storage sites each capable of storing a bit of graphics data corresponding to a picture element of a graphics image to be formed by said display means;

raster memory control means communicatively coupled to said address bus, said data bus, said raster memory means and said system control means, said raster memory control means being responsive to said first control signal and operative to cause bits of graphics data input from the host computer to be stored in said raster memory means, said raster memory control means including skip pattern control means for periodically inhibiting a storage operation in a predetermined manner so as to prevent certain bits of the data from being stored in said raster memory means, said skip pattern control means including a skip pattern memory for storing a plurality of predetermined skip pattern commands, and logic means controlled by said system control means and operative to select one of said skip pattern commands and to generate a first signal in accordance therewith for periodically inhibiting said storage operation, said skip pattern control means further including modulo arithmetic logic means for generating a second signal for periodically inhibiting said storage operation; and video control means communicatively coupled to said address bus, said data bus, said raster memory means, said display means, and said system control means, said video control means being responsive to said second control signal and operative to read out in raster fashion data stored in said raster memory means and to use such data to generate a video signal for input to said display means.

[32. A computer graphics display system comprising raster memory means including an array of N rows and M columns of storage sites, means for generating a control signal, means responsive to said control signal and operative to read out in raster fashion data stored in any selected block of n rows and m columns of said storage sites, where n is an integer less than N, and M is an integer less than M, and to use such data to generate a raster scan signal from the data read out of said selected block, and display means responsive to said raster scan signal and operative to display an image corresponding to the data contained in said selected block.]

*33. An apparatus for generating a graphics display having the illusion of smooth panning across an image represented by a plurality of discrete picture elements, said image being larger than that which can be displayed at one time on a video display device, comprising:*

*a memory device;*

*means for entering in the storage sites of said memory device a set of digital data corresponding to the discrete picture elements of said image, selected subsets of said digital data being readable from said memory to produce a corresponding raster signal displayable by said video display device;*

*specifying means for specifying a first particular portion of said memory storage sites, said first particular portion containing a first subset of digital data corresponding to a first part of said image, said first part being displayable at one time on said video display device;*

*first selecting means for selecting a second particular portion of said memory storage sites, said second particular portion containing a second subset of digital data corresponding to a different, second part of said image, said second part also being displayable at one time on said video display device;*

*second selecting means for selecting a plurality of other portions of said memory storage sites, said other portions each containing a respective other subset of digital data corresponding to other parts of said image, said other parts being situated at contiguous spaced intervals in said image between said first part and said second part, each of said other parts also being displayable at one time on said video display device;*

*read-out means for reading out digital data in raster fashion from said memory device and for providing said corresponding raster signal in response thereto;*

*control means, cooperating with said read-out means, said specifying, means and said first and second selecting means, for directing said read-out means initially to read out in raster fashion said first subset of digital data contained in said first portion to develop a first raster signal, then sequentially to read out the other subsets of digital data in each of said other portions to develop a series of other raster signals, then to read out in raster fashion the second subset of digital data contained in said second portion to develop a second raster signal; and*

*display production means, connected to said read-out means, for using said first raster signal, said other raster signals, and said second raster signal in the order that they are developed to produce on said video display device a raster display of the data contained in the various selected portions such that the produced display creates the illusion of smooth panning across said image from said first part to said second part.*

*34. An apparatus according to claim 33 wherein said control means synchronizes the read-out of each subset of digital data with a new frame of said video display device, and wherein said first part, each other part and said second part of said image are sequentially spaced from each other by a very few discrete picture elements.*

*35. An apparatus for generating a graphics display comprised of n rows and m columns of discrete picture elements, comprising:*

*storage means for storing a set of picture element data in a memory device having storage sites corresponding to an $N \times M$ array;*

*selecting means for selecting a particular portion of the storage sites corresponding to an $m/Z \times n/Z$ array where $n/Z$ is equal to or less than N, where $m/Z$ is equal to or less than M, and were Z is an integer;*

*read-out means, cooperating with said storage means and said selecting means, for reading out in raster fashion the data contained in each row of said particular portion and for supplying said read-out data as a raster signal, the data in each storage site being supplied Z times, and the data read out of each row being repeated Z times before data from the next row is read out;*

*display utilization means, connected to said read-out means, for using said raster signal in a video display device to produce a "zoomed" display of the data contained in said particular portion, said display containing a $Z \times Z$ array of picture elements corresponding to each storage site in said portion of said $N \times M$ array; and*

*inhibit means, cooperating with said read-out means and said display utilization means, for selectively inhibiting the supply of data from each storage site for one or more of the Z consecutive supply times, and for inhibiting the corresponding ones of the repeat readouts of each row of data such that a zoomed display of a plurality of adjacent storage sites containing data will be displayed as an array of spaced apart dots rather than as a solid area.*

*36. An apparatus for generating a graphics display having a background grid, comprising:*

*storing means for storing a set of data in a memory device, said stored data respectively representing the displayable picture elements of an image;*

*read-out means, cooperating with said storing means, for sequentially reading out in raster fashion the data contained in said memory device to develop a raster data signal;*

*grid signal generation means for simultaneously generating a grid signal including a train of pulses which occur in a series of regularly timed intervals; and*

*mixing means, connected to said read-out means and to said grid signal generation means, for mixing said raster data signal and said grid signal to develop a composite raster display signal in which read out datum components of said raster signal are combined with simultaneously occurring pulses of said grid signal, said composite raster display signal being utilizable by a raster-type video display device to produce a graphics display including the data read out of said memory device and a background grid including vertical and horizontal grid lines of data superimposed on the displayed picture element data.*

*37. An apparatus for generating a graphics display as recited in claim 36 wherein said grid signal generation means includes modification means for modifying certain ones of said pulses so as to cause said grid to appear to contain major and minor grid lines of different intensity.*

*38. An apparatus for implementing smooth panning in a computer graphics display system of the type having a memory storing digital data corresponding to picture ele-*

*ments of an image that is larger than can be displayed at one time, and in which a subset of said stored digital data is read out from said memory and supplied to a video display device in raster fashion to produce on said device a display of the portion of said image represented by said data subset, each such data subset being specified by a corresponding origin address within said memory, comprising:*

*pan clock means for generating a pan clock signal that is synchronized with the frame rate of said video display device;*

*first means for specifying a first data subset representing that first position of said image at which panning is to begin;*

*second means for specifying a second data subset representing the second portion of said image at which is panning is to terminate;*

*third means for specifying data subsets representing closely, sequentially contiguous portions of said image intermediate said first and second portions; and*

*read-out means, cooperating with said pan clock means and with said first, second and third means, for sequentially reading out from said memory said first, said group of intermediate, and said second data subsets in raster fashion for supply to said video display device to produce corresponding sequential displays of the portions of said image represented thereby, each such sequential readout being synchronized with said pan clock signal, whereby the resultant display has the illusion of smooth panning in which each successive video frame synchronized display represents a portion of said image that is closely contiguous to the preceeding display.*

*39. An apparatus according to claim 38 wherein said first, second and third means each is configured to specify the respective said first, second, and intermediate data sets by an associated data set origin address.*

*40. An apparatus according to claim 39 wherein each successive intermediate origin address differs from the preceding intermediate origin address by a very few picture element distances.*

*41. An apparatus according to claim 39 wherein said third means for specifying comprises:*

*spacing logic circuitry for determining a value corresponding to the desired spacing between said sequentially contiguous portions of said image; and*

*comparing logic circuitry for determinng if the portion of said image that is currently being displayed on said video device is the same as said second portion, and if not, for arithmetically combining said desired spacing value with the origin address of the data subset representing the currently displayed portion of said image to obtain the new origin address corresponding to the next sequential portion of said image.*

*42. An apparatus for providing a "zoom" magnification effect in a computer graphics display system of the type wherein digital data representing each picture element of an image is stored in a memory and wherein a subset of said digital data is read out from said memory and supplied to a video display device in raster fashion to produce a display of a corresponding portion of said image, comprising:*

*means for supplying to said video display device, during read out of the data for each raster scan line of said video display device, each datum a plurality of p times and for supplying no datum for (Z-p) times, where Z is an integer equal to the desired "zoom" magnification scale;*

*means for repeating said readout of the data for each raster scan line a multiple of q raster scan line times and for supplying no datum for (Z-q) raster scan line times before reading out the data for the next raster scan line;*

*whereby a "zoom" magnified display is produced in which each stored picture datum in said subset is displayed on said video display device as a $p \times q$ array of contiguous picture elements that is spaced from the adjacent displayed array corresponding to a contiguous stored datum in said subset.*

*43. A panning raster scan graphic display apparatus comprising:*

*memory means for storing data representative of the elements of an image larger than that which can be simultaneously displayed by said apparatus;*

*access means, cooperating with said memory means, for accessing from said memory means in accordance with a raster control signal the subset of said data representing elements of a specified subimage of said image, and for forming a raster scan signal representation of said subimage;*

*display means, connect to said access means and receiving said raster scan signal, for visually portraying said specified subimage;*

*control means for specifying a first subimage of said image for current display and a second subimage of said image for eventual display; and*

*spacing means, cooperating with said access means and said control means, for determining a sequence of subimages of said image, said sequence starting with said first subimage and ending with said second subimage, and for sequentially specifying to said access means, in coordination with said raster control signal, each of said subimages in said sequence, thereby panning from said first to second subimage on said display means.*

*44. An apparatus according to claim 43 wherein said spacing means determines consecutive subimages in said sequence to be substantially overlapping so as to provide a smooth panning.*

*45. A zoomable raster scan display apparatus comprising:*

*memory means for data storage of an M row by N column picture element 'image' array representing an image to be zoomed;*

*zoom means for accessing picture elements from said memory means and for generating thereform a raster scan signal representing a 'zoom' array of ZM rows by ZN columns of picture elements, where Z is an integer zoom value, said 'zoom' array composed of Z by Z blocks of like picture elements, each block corresponding to a single picture element in said 'image' array;*

*display means, receiving said raster scan signal, for displaying a zoomed image corresponding to said 'zoom' array of picture elements; and*

*blanking means, cooperating with said zoom means, for processing said raster scan signal before utilization by said display means to selectively mask a specifiable subset of picture elements in each said $Z \times Z$ block.*

* * * * *